US006388407B1

(12) United States Patent
Eguchi

(10) Patent No.: US 6,388,407 B1
(45) Date of Patent: May 14, 2002

(54) APPARATUS FOR CONTROLLING A DRIVING MOTOR

(75) Inventor: Takahiro Eguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/610,011

(22) Filed: Jul. 3, 2000

(30) Foreign Application Priority Data

Jul. 2, 1999 (JP) ............................................. 11-189567

(51) Int. Cl.[7] ................................................ H02P 3/18
(52) U.S. Cl. ........................ 318/376; 318/139; 477/47; 180/65.2
(58) Field of Search ................... 318/139, 587, 318/376, 375; 701/84, 87, 93–95; 180/170, 178, 179, 65.6, 65.7, 65.8, 65.2; 477/47, 174–178

(56) References Cited

U.S. PATENT DOCUMENTS

| 5,199,399 | A | * | 4/1993 | Shibuya ....................... 123/339 |
| 5,446,351 | A | * | 8/1995 | Kusano et al. ............... 318/139 |
| 5,749,804 | A | * | 5/1998 | Toukura ....................... 477/47 |
| 6,013,992 | A | * | 1/2000 | Ishikawa et al. ............. 318/376 |
| 6,104,976 | A | * | 8/2000 | Nakamura ................... 701/95 |

FOREIGN PATENT DOCUMENTS

| JP | 01244930 A | 9/1989 |
| JP | 11141367 A | 5/1999 |

OTHER PUBLICATIONS

Patent abstract of Japan 01244930 Sep. 29, 1989.
Patent abstract of Japan 09202159 Aug. 5,1997.

* cited by examiner

Primary Examiner—Khanh Dang
(74) Attorney, Agent, or Firm—Sughrue Mion, PLLC

(57) ABSTRACT

A driving motor stopping unit for a vehicle, which vehicle allows transmission of driving force from a driving motor to driving wheels irrespective of releasing an accelerator pedal at a certain or lower vehicle speed when a transmission is selected to a driving range, wherein said vehicle is further provided with a driving force decreasing unit which switches the driving force in accordance with depression of a brake pedal such that the driving force is made lower at a depression of the brake pedal than at a release of the brake pedal, and the driving motor is stopped after the driving force is decreased by the driving force decreasing unit.

20 Claims, 10 Drawing Sheets

APPARATUS FOR CONTROLLING A DRIVING MOTOR

FIELD OF TEE INVENTION

The present invention relates to an apparatus for controlling a driving motor. More particularly, to an apparatus which controls and automatically stops the driving motor of a vehicle while the vehicle stops.

BACKGROUND OF THE INVENTION

Various types of vehicles with an automatic transmission are known. One known automatic transmission transmits driving force from the driving motor, such as an engine, to driving wheels when the transmission is set in a driving range, such as a D range, and the vehicle moves at a certain or lower vehicle speed when the accelerator pedal is released. Recently, for the purpose of improving fuel consumption, a vehicle has been developed with a driving force decreasing unit, which decreases the creep driving force when the brake pedal is depressed while the vehicle is in an idling condition and moves at a certain or lower vehicle speed, and a vehicle with a driving motor stopping unit, which automatically stops the driving motor while the vehicle stops in an idling condition.

In creep running, the vehicle with an automatic transmission moves slowly as if it creeps along the ground when the transmission is set to a running range, such as a D or R range and the accelerator pedal is released (the driving motor is in an idling condition).

The decision to have the driving motor stopping unit stop the driving motor is based on a determination of whether or not the detected vehicle speed becomes 0 km/h. The accuracy of the detected vehicle speed is determined by a vehicle speed sensor and an ECU (Electronic Control Unit) calculating vehicle speed based on information obtained from the vehicle speed sensor. For this reason, depending on the detectability of the vehicle speed sensor or throughput of the ECU, the vehicle speed may be regarded as 0 km/h even if the vehicle is not completely stopped. For example, if the vehicle speed sensor cannot detect a minimum vehicle speed of less than 1 km/h, the detected vehicle speed is 0 km/h, notwithstanding that the vehicle is actually moving at a vehicle speed of less than 1 km/h. When the detected vehicle speed becomes 0 km/h, the driving motor stopping unit automatically stops the driving motor, even if the vehicle is not completely stopped. If the creep driving force is greater before automatically stopping the driving motor, a braking force greater than the creep driving force is required in order to stop the vehicle, and a large amount of driving force difference exists until the driving force falls to zero. Therefore, if the driving motor is automatically stopped before the vehicle stops fully and the driving force falls to zero, the vehicle often stops suddenly due to a greater braking force and greater driving force difference.

In view of the above, the present invention seeks to provide a an apparatus for controlling a driving motor which eliminates sudden stops by the vehicle, even if the driving motor is stopped before the vehicle stops completely.

SUMMARY OF THE INVENTION

According to the present invention, there is provided an apparatus for controlling and stopping a driving motor for a vehicle, which vehicle allows transmission of driving force from a driving motor to driving wheels, irrespective of releasing an accelerator pedal at a certain or lower vehicle speed when a transmission is set to a driving range. The apparatus also includes a driving force decreasing unit which switches the driving force based on depression of a brake pedal such that the driving force is made lower when the brake pedal is depressed than when the brake pedal is released, and the apparatus includes means for stopping the driving motor after the driving force is decreased by the driving force decreasing unit.

There is also provided a vehicle with an apparatus for controlling and stopping a driving motor, which vehicle allows transmission of driving force from a driving motor to driving wheels, irrespective of releasing an accelerator pedal at a certain or lower vehicle speed when a transmission is set to a driving range. The apparatus also includes a driving force decreasing unit which switches the driving force based on a brake pedal being depressed such that the driving force is made lower when the brake pedal is depressed than when the brake pedal is released, and the vehicle is controlled such that the driving motor is stopped after the driving force is decreased by the driving force decreasing unit.

According to such an apparatus for controlling and stopping a driving motor and vehicle, because the driving force is decreased before stopping the driving motor, the depression force of the brake pedal is reduced (i.e., braking force becomes smaller) before stopping the driving motor, and the driving force difference becomes smaller, even if the driving motor is stopped so that the driving force falls to zero. As a result, the vehicle does not stop suddenly if the driving motor is stopped before the vehicle stops completely.

The term "a certain vehicle speed" indicates a vehicle speed just before the vehicle stops. Therefore, if a certain vehicle speed is 5 km/h, as an example in the preferred embodiment, the vehicle speed range "at a certain or lower vehicle speed" includes vehicle speeds from 0 km/h (when the vehicle stops) to 5 km/h.

Further, because the purpose of the invention is to prevent sudden stops of the vehicle due to the stopping of the driving motor (driving force is zero) before the vehicle stops completely, the wording "after the driving force is decreased by the driving force decreasing unit" does not include a condition where the driving force is zero.

BRIEF DESCRIPTION OF THE DRAWINGS

FIG. 7A shows a backward displacement detecting version of the vehicle, and FIG. 7B shows a vehicle movement detecting version;

FIG. 8A shows a backward displacement detecting version of the vehicle, and FIG. 8B shows a vehicle movement detecting version;

DESCRIPTION OF THE PREFERRED EMBODIMENT

A vehicle with an apparatus for controlling and stopping a driving motor can automatically stop the driving motor while the vehicle stops. Further, the apparatus is provided with a driving force decreasing unit which decreases creep driving force when the brake pedal is depressed when the driving motor is in an idling condition and the vehicle moves at a certain or lower vehicle speed. When the apparatus stops the driving motor, it stops the driving motor after the driving force is decreased by the driving force decreasing unit. The vehicle is further provided with a braking force control unit which is capable of retaining braking force after the brake pedal is released.

System Configuration of Vehicle and Others

Figure 1:
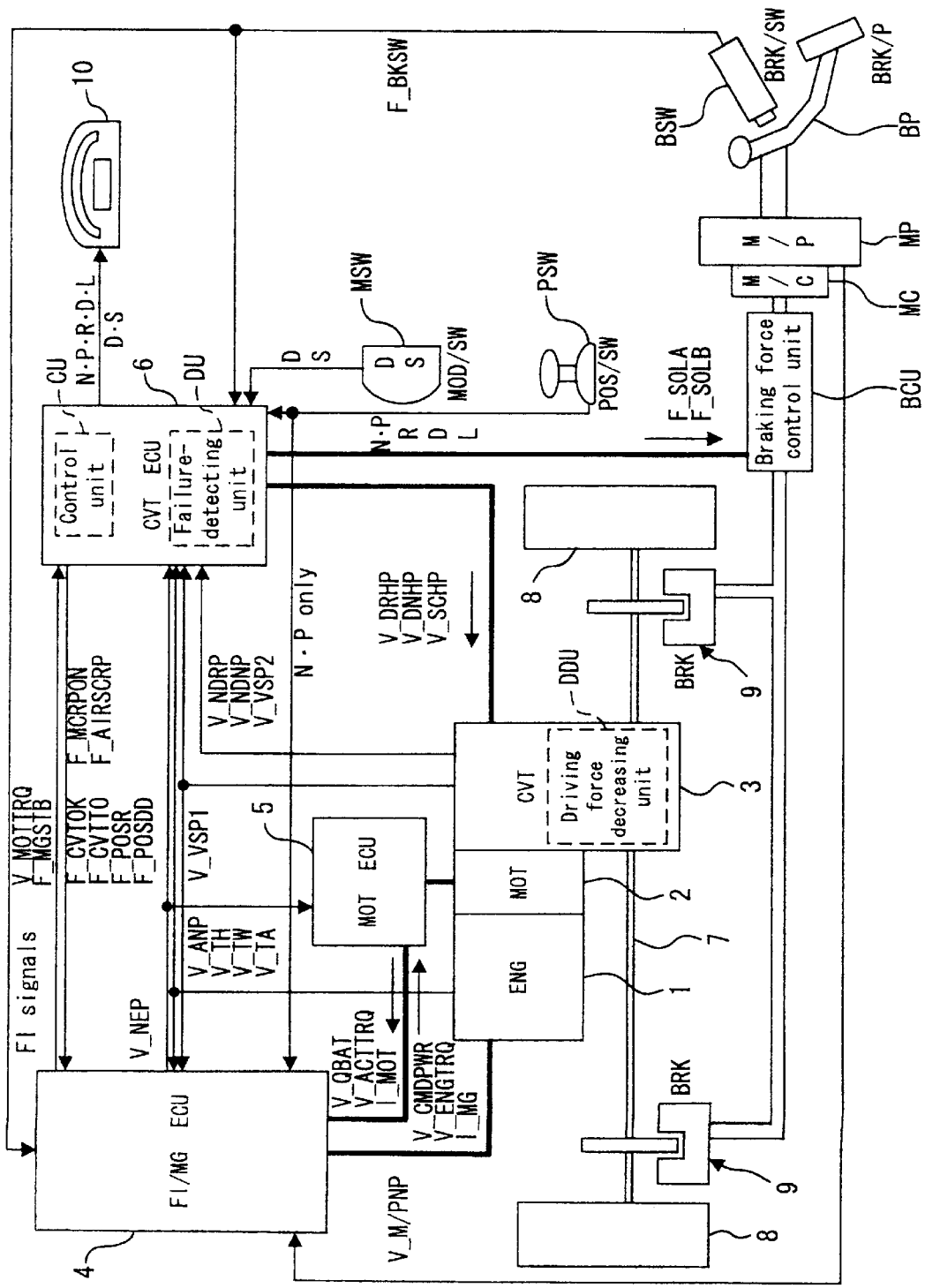
FIG. 1 shows a system configuration of a vehicle provided with an apparatus for controlling and stopping a driving motor stopping according to a preferred embodiment of the invention.

The system configuration of a vehicle according to the present invention will be described with reference to FIG. 1. The vehicle shown in this embodiment is a hybrid type vehicle having an engine 1 and an electric motor 2 as a driving motor, and is provided with a belt-type continuously variable transmission 3 (hereinafter referred to as CVT 3). Engine 1 is an internal combustion engine operates on gasoline and the like, and electric motor 2 operates on electricity. The driving motor of the vehicle is not restricted merely to an engine or a motor. Similarly, as long as the transmission is an automatic transmission, the transmission is not restricted to a particular type. The transmission may be an automatic transmission having a torque converter.

Engine (Driving Motor), CVT Transmission) and Motor (Driving Motor)

Engine 1 is controlled at a fuel injection electronic control unit (hereinafter referred to as FI ECU). The FI ECU is integrally constructed with a management electronic control unit (hereinafter referred to as MG ECU), and it is incorporated in a fuel injection/management electronic control unit 4 (hereinafter referred to as FI/MG ECU). Motor 2 is controlled at a motor electronic control unit 5 (hereinafter referred to as MOT ECU). Further, CVT 3 is controlled at a CVT electronic control unit 6 (hereinafter referred to as CVT ECU).

Figure 2:
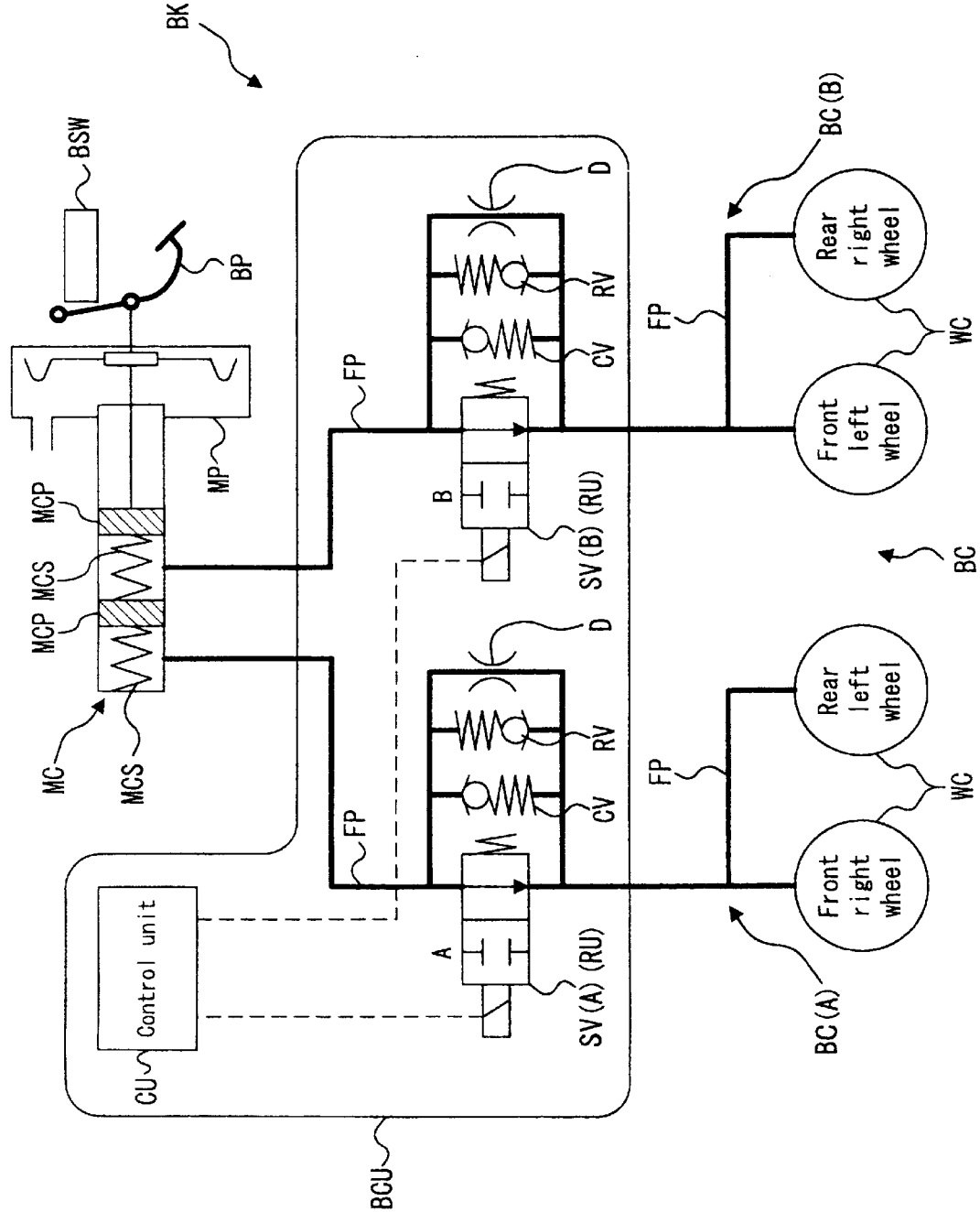
FIG. 2 shows a construction of a braking force retaining unit according to a preferred embodiment of the invention.

A drive axle 7 provided with driving wheels 8, is mounted to the CVT 3. Each driving wheel 8 is provided with a disc brake 9, which includes a wheel cylinder WC and the like (FIG. 2). The wheel cylinders WC of the disc brakes 9 are connected to a master cylinder MC through a braking force control unit BCU. When the driver depresses the brake pedal BP, the brake pedal load generated is transmitted to the master cylinder MC through the master power Mp. The brake switch BSW detects whether or not the brake pedal BP is depressed.

Engine 1 is an internal combustion engine which makes use of thermal energy. Engine 1 drives the driving wheels 8 through CVT 3 and drive axle 7. in order to improve fuel consumption, engine 1 may be automatically stopped while the vehicle stops. For this reason, the vehicle is provided with an apparatus for controlling and stopping a driving motor for automatically stopping engine 1 when a certain automatic engine stop condition is satisfied.

Motor 2 has an assist mode for assisting the engine drive with the use of electric energy from a battery (not shown). Motor 2 has a regeneration mode for converting the kinetic energy derived from the rotation of drive axle 7 into electric energy. When the engine does not require an assist from the assist mode (such as for starting on a down slope or deceleration of the vehicle), the converted electric energy is stored in the battery. Further, motor 2 has an actuation mode for actuating engine 1.

CVT 3 includes an endless belt wound between a drive pulley and a driven pulley to enable a continuously variable gear ratio by changing the winding radius of the endless belt. The winding radius change is achieved by changing each pulley width. CVT 3 engages a starting clutch and an output shaft to transmit the output of engine 1 converted by the endless belt into drive axle 7 through gears at the output side of the starting clutch The vehicle equipped with CVT 3 enables creep running while engine 1 is idling, and such a vehicle requires a driving force decreasing unit DDU for decreasing driving force to be utilized for the creep running.

Driving Force Decreasing Unit

The driving force decreasing unit DDU is incorporated in CVT 3. The driving force decreasing unit DDU variably controls the driving force transmission capacity of the starting clutch, thereby changing the creep driving force. The driving force decreasing unit DDU increases driving force when detecting displacement (or backward displacement) of the vehicle. The driving force decreasing unit DDU comprises CVT ECU 6 which will be described later.

The driving force decreasing unit DDU controls the driving force transmission capacity of the starting clutch and switches to the predetermined driving force in each creep condition when CVT ECU 6 determines conditions (hereinafter described) required for a weak creep condition, middle creep condition, strong creep condition or a strong creep condition for driving. Further, the driving force decreasing unit DDU increases the driving force transmission capacity of the starting clutch and switches to the strong creep condition if displacement or backward displacement of the vehicle is detected when starting the vehicle on a slope. CVT BCU 6 determines conditions for switching the creep driving force, and it transmits a hydraulic pressure command value to a linear solenoid valve of CVT 3, where the engagement hydraulic pressure of the starting clutch is controlled. In the driving force decreasing unit DDU, the engagement force of the starting clutch is adjusted at CVT 3 based on the hydraulic pressure command value. The driving force transmission capacity is therefore changed and the creep driving force is adjusted. Because the driving force decreasing unit DDU decreases the driving force, the fuel consumption of the vehicle is improved. Fuel consumption of the vehicle is improved by reducing loads at engine 1, a hydraulic pump of the starting clutch and the like. The term "driving force transmission capacity" indicates the maximum driving force (driving torque) transmitted by the starting clutch. Therefore, if the driving force generated at engine 1 is greater than the driving force transmission capacity, the starting clutch does not transmit the remaining driving force, which is beyond the driving force transmission capacity, to driving wheels 8.

When a failure-detecting unit DU detects a malfunction of the braking force control unit BCU, the switching operation of the driving force decreasing unit DDU to the weak creep condition is restricted.

The driving force decreasing unit DDU transmits the driving force from the driving motor to the driving wheels 8, regardless of the release of the accelerator pedal at a certain or lower vehicle speed when the transmission is set to a running range. The driving force decreasing unit DDU also switches driving force in accordance with depression of the brake pedal such that the driving force is made lower when the brake pedal BP is depressed than when the brake pedal BP is released. The driving force is switched to a weak it condition when the brake pedal BP is depressed in order to improve fuel consumption. Meanwhile, the driving force is switched to a strong condition when the brake pedal BP is released for starting or accelerating of the vehicle, as well as for preventing backward displacement of the vehicle without requiring braking force.

According to this embodiment, the creep driving force of the vehicle includes three conditions: (1) a strong condition; (2) a weak condition; and (3) a middle condition between the strong and weak conditions. The driving force transmission capacity at each condition is predetermined to be greater in the strong condition, less in the weak condition, and intermediate in the middle condition. In this embodiment, the strong condition (strong creep driving force) is referred to as a strong creep condition, the weak condition (weak creep driving force) is referred to as a weak creep condition, and the middle condition (intermediate creep driving force) is referred to as a middle creep condition. Further, the strong creep condition includes two driving force levels, i.e., a strong level and a weak level. The strong level is referred to as a strong creep condition, and the weak level is referred to as a strong creep condition for driving. In the strong creep condition, the driving force is adjusted in order to keep the vehicle stationary on a slope having an inclination angle of 5 degrees. In the strong creep condition for driving, the driving force is adjusted in to be less than that in the strong creep condition. The strong creep condition for driving is a preliminary condition before switching to the weak creep condition. In the weak creep condition, almost no driving force is obtained. In the middle creep condition, the driving force is controlled substantially at a mid point between the strong creep condition and the weak creep condition. The middle creep condition is an intermediate condition when the driving force is decreased stepwise in the process of switching from the strong creep condition to the weak creep condition. The strong creep condition is achieved when the accelerator pedal is released at a certain or lower vehicle speed (idling condition) and the positioning switch PSW selects a running range and when the brake pedal BP is released. In the strong creep condition, the vehicle moves slowly as if it creeps along the ground. If the driver depresses the brake pedal BP in this situation, the weak creep condition is achieved. The vehicle stops or moves at an extremely low speed in the weak creep condition.

The wording "the positioning switch PSW selects a running range" means that the transmission is set to a running range.

Positioning Switch

Range positions of the positioning switch PSW are selected by a shift lever. These range positions are selected from a P range for parking the vehicle, an N range as a neutral range, an R range for backward running, a D range for normal running, and an L range for obtaining a sudden acceleration or strong engine brake. The term "running range" indicates a range position, at which the vehicle can move. In this vehicle, the running range includes the D range, L range and R range. When the positioning switch PSW selects the D range, a D mode as a normal running mode and an S mode as a sports mode can be selected by a mode switch MSW. Information from the positioning switch PSW and the mode switch MSW is transmitted to CVT ECU 6 and a meter 10. Meter 10 indicates the range information and the mode information selected by the positioning switch PSW and the mode switch, respectively.

In this preferred embodiment, reduction of the creep driving force (switching operation to the middle creep condition and the weak creep condition) is carried out while the positioning switch PSW is set in the D or L range. The strong creep condition is retained while the positioning switch PSW is set in the R range. The driving force is not transmitted to the driving wheels 8 while the positioning switch PSW is set in the N or P range. However, the driving force transmission capacity is decreased and the driving force is substantially switched to the weak creep condition.

ECU and Others

The FI ECU contained in FI/MG ECU 4 controls the amount of fuel injection to achieve the optimum air fuel ratio, and it also generally controls engine 1. Various kinds of information such as a throttle angle and conditions of engine 1 are transmitted to the FI ECU such that engine 1 is controlled based on this information. The MG ECU contained in FI/MG ECU 4 mainly controls MOT ECU 5 as well as determining the automatic engine stop conditions and automatic engine actuation conditions. The MG ECU receives information regarding the conditions of motor 2 and other information such as the conditions of engine 1 from the FI ECU, and based on this information it sends instructions about the mode switching of motor 2 to MOT ECU 5. Further, the MG ECU receives information such as the conditions of CVT 3, conditions of engine 1, range information of the positioning switch PSW, conditions of motor 2 and the like, and based on this information it determines whether engine 1 should be automatically stopped or automatically actuated.

MOT ECU 5 controls motor 2 based on a control signal from FI/MG ECU 4. The control signal from FI/MG ECU 4 includes mode information instructing actuation of engine 1 by motor 2, assistance of the engine actuation or regeneration of electric energy, and an output required value to motor 2, and MOT ECU 5 sends an order to motor 2 based on this information. Further, MOT ECU 5 receives information from motor 2 and transmits information such as the amount of generated energy and the capacity of the battery to FI/MG ECU 4.

CVT ECU 6 controls the transmission gear ratio of CVT 3, the driving force transmission capacity of the starting clutch and the like. Various kinds of information such as the conditions of CVT 3, conditions of engine 1, range information of the positioning switch PSW and the like is transmitted to CVT ECU 6, and based on this information CVT ECU 6 transmits a signal to CVT 3. The signal includes control of the hydraulic pressure of each cylinder provided at the drive pulley and the driven pulley of CVT 3, and control of the hydraulic pressure of the starting clutch. As shown in FIG. 2, CVT ECU 6 comprises a control unit CU for the ON/OFF control (shut-off/communicate) of the solenoid valves SV(A), SV(B), which function as the braking force retaining means RU of the braking force control unit BCU. CVT ECU 6 transmits a signal for turning ON and OFF the solenoid valves SV(A), SV(B) to the braking force control unit BCU.

CVT ECU 6 also determines the switching of the creep driving force as well as determining whether the driving force should be increased as a result of detecting displacement (or backward displacement) of the vehicle while the braking force control unit BCU actuates. This information is transmitted to the driving force decreasing unit DDU of CVT 3. CVT ECU 6 also comprises a failure-detecting unit DU for detecting a malfunction of the braking force control unit BCU.

Brake (Braking Force Control Unit)

Disk brakes 9 are constructed such that a disk rotor rotatable with driving wheel 8 is pressed between the brake pads moved by the wheel cylinder WC (FIG. 2) and braking force is obtained by the frictional force therebetween. Brake fluid pressure within the master cylinder MC is transmitted to the wheel cylinders WC through the braking force control unit BCU.

The braking force control unit BCU continuously retains the brake fluid pressure within a wheel cylinder WC, i.e. the braking force after depression of the brake pedal BP is released. The braking force control unit BCU comprises a control unit CU within CVT ECU 6. Construction of the braking force control unit BCU will be described later in greater detail with reference to FIG. 2.

The ON/OFF operation of the solenoid valve will now be described.

In the normally open type solenoid valve, when the solenoid valve is ON, the solenoid valve closes to a shut-off position such that a flow of brake fluid is shut off, and when the solenoid valve is OFF, the solenoid valve opens to a communicating position such that a flow of brake fluid is allowed. However, in the normally closed type solenoid valve, when the solenoid valve is ON, the solenoid valve opens to a communicating position such that a flow of brake fluid is allowed, and when the solenoid valve is OFF, the solenoid valve closes to a shut-off position such that a flow of brake fluid is shut off. As will be described later, solenoid valves SV(A), SV(B) in the preferred embodiment are the normally open type. A driving circuit within the control unit CU starts or stops a supply of electric currents to respective coils of the solenoid valves SV(A), SV(B) to turn ON and OFF the solenoid valves.

A master cylinder MC is a device for converting a brake pedal depression into hydraulic pressure. In order to assist brake pedal depression, a master power MP is provided between the master cylinder MC and the brake pedal BP. The master power MN enhances braking force by applying negative pressure of engine 1 or compressed air to the driver's brake pedal depression force. A brake switch BSW is provided at the brake pedal BP to detect whether or not the brake pedal BP is depressed.

Driving Motor Stopping Unit

The driving motor stopping unit incorporated in the vehicle includes the FI/MG ECU, CVT ECU 6 and other elements. The driving motor stopping unit enables an automatic engine stop operation while the vehicle stops. The automatic engine stop conditions are determined at the FI/MG ECU 4 and CVT ECU 6. The automatic engine stop conditions will be described later. When all of the automatic engine stop conditions are satisfied, FI/MG ECU 4 sends an engine stop order to engine 1 to automatically stop engine 1. Because the driving motor stopping unit automatically stops engine 1, the vehicle's fuel consumption improves.

Because the automatic engine stop conditions include conditions required for the weak creep condition, which are determined at the driving force decreasing unit DDU, all of the automatic engine stop conditions are not satisfied unless the conditions for the weak creep conditions are satisfied. Decreasing driving force to the weak creep condition occurs when the vehicle speed becomes 5 km/h. Automatic engine stop operation occurs when the vehicle speed falls to 0 km/h Therefore, the driving force decreasing unit DDU decreases driving force to the weak creep condition, and thereafter, the driving motor stopping unit automatically stops engine 1 at a vehicle speed of 0 km/h. Therefore, because the driving force is first decreased to the weak creep condition, the driving force difference will be smaller even if engine 1 is automatically stopped and driving force falls to zero. When the driver intends to stop the vehicle while in the strong creep condition, the required braking force must be greater than the driving force in the strong creep condition. However, because the driving force is first decreased to the weak creep condition before automatically stopping engine 1, the braking force required for stopping the vehicle may be less than that required in the strong creep condition. The vehicle can be'stopped even if depression of the brake pedal BP is reduced before automatically stopping engine 1. Therefore, because the driving force difference and braking force is smaller, sudden stops by the vehicle can be prevented even if the driving motor stopping unit automatically stops engine 1 and the driving force falls to zero before the vehicle stops completely.

FI/MG ECU 4 and CVT ECU 6 determine automatic engine actuation conditions while the driving motor stopping unit automatically stops engine 1. When all of the automatic engine actuation conditions are satisfied, FI/MG ECU 4 sends an engine actuation order to MOT ECU 5. MOT ECU 5 further transmits an engine actuation order to motor 2. Motor 2 then automatically actuates engine 1, and at the same time, the driving force is switched to the strong creep condition. The automatic engine actuation conditions will be described later.

Also, when the failure-detecting unit DU detects a malfunction of the braking force control unit BCU, operation of the driving motor stopping unit is prohibited.

Signals

Signals to be transmitted and received in this system will be described. With reference to FIG. 1, the letter "F_" in front of each signal indicates that the signal is flag information, which is either a 0 or 1. The letter "V_" indicates that the signal is numerical information (unit is optional), and the letter "I_" indicates that the signal includes different kinds of information.

Signals transmitted from FI/MG ECU 4 to CVT ECU 6 will be described. V_MOTTRQ represents an output torque value of motor 2. F_MGSTB is a flag showing whether all of the engine stop conditions determined at FI/MG ECU 4 are satisfied. If all the conditions are satisfied, a 1 is provided, and if not 0 is provided. The automatic engine stop conditions regarding F_MGSTB will be described later. When F_MGSTB and F_CVTOK (hereinafter described) are both set to 1, engine 1 is automatically stopped. When one of these flags is set to 0, engine 1 is automatically actuated.

A signal transmitted from FI/MG ECU 4 to CVT ECU 6 and MOT ECU 5 will be described. V_NEP represents engine speed.

Signals transmitted from CVT ECU 6 to FI/MG ECU 4 will be described. F_MCRPON is a flag indicating whether or not the driving force is in the middle creep condition. A 1 is provided in the middle creep condition, and if not, a 0 is provided. When F_MCRPON is 1, engine 1 is required to blow middle air in the middle creep condition (weaker air than that in the strong creep condition). F_AIRSCRP is a strong air demand flag in the strong creep condition. If strong air is required in the strong creep condition, a 1 is provided, and if not a 0 is given. When both F_MCRPON and F_AIRSCRP are 0, FI/MG ECU 4 blows weak air in the weak creep condition. In order to keep the engine idle speed at a certain level regardless of the driving force in the strong creep condition, middle creep condition or the weak creep condition, the engine output should be adjusted by blowing air corresponding to the strong creep condition, middle creep condition or the weak creep condition. When the driving force is in the strong creep condition and the load of engine 1 is higher, a strong air blow (strong air in the strong creep condition) is required. The term "air blow" means the supply of air from an air passage by-passing a throttle valve in engine 1 to an intake pipe positioned downstream from the throttle valve. Air flow is adjusted by controlling the degree of the opening of the air passage. F_CVTOK is a flag indicating whether all of the engine stop conditions determined at CVT ECU 6 are satisfied. If all the conditions are satisfied, a 1 is provided, and if not a 0 is provided. The automatic engine stop conditions regarding F_CVTOK will be described later. F_CVTTO is a flag indicating whether the oil temperature of CVT 3 is greater than a certain value. If the oil temperature is equal to or greater than the certain value, a 1 is provided, and if the oil temperature is less than the value, a 0 is provided. The oil temperature of CVT 3 is obtained from an electrical resistance value of the linear solenoid valve controlling the hydraulic pressure of the starting clutch at CVT 3. F_POSR is a flag indicating whether the positioning switch PSW is set in the R range. If the positioning switch PSW is set in the R range, a 1 is provided, and if not a 0 is provided. F_POSDD is a flag indicating whether the positioning switch PSW is set in the D range and the mode switch MSW is set in the D mode. If the D range and D mode (D range/D mode) are selected, a 1 is provided, and if not, a 0 is provided. When FI/MG ECU 4 does not receive any information indicating the D range/D mode, R range, P range or N range, FI/MG ECU 4 determines that either the D range/S mode or L range is selected.

Signals transmitted from engine 1 to FI/MG ECU 4 and CVT ECU 6 will be described. V_ANP represents a negative pressure value at the intake pipe of engine 1. V_TH represents a throttle angle. V_TW represents a temperature of the cooling water at engine 1. V_TA represents the intake temperature of engine 1. The brake fluid temperature in the braking force control unit BCU disposed within the engine compartment is obtained from the intake temperature. This is because both temperatures change with respect to the temperature at the engine compartment.

A signal transmitted from CVT 3 to FI/MG ECU 4 and CVT ECU 6 will be described. V_VSPI represents a vehicle speed pulse from one of two vehicle speed pickups provided in CVT 3. Vehicle speed is calculated based on this vehicle speed pulse.

Signals transmitted from CVT 3 to CVT ECU 6 will be described. V_NDRP represents a pulse showing the number of revolutions of the drive pulley provided at CVT 3. V_NDNP represents a pulse showing the number of revolutions of the driven pulley provided at CVT 3. V_VSP2 represents a vehicle speed pulse from the other vehicle speed pickup at CVT 3. V_VSP2 is more accurate than V_VSP1, and V_VSP2 is used for calculating the amount of clutch slipping at CVT 3.

Signals transmitted from MOT ECU 5 to FI/MG ECU 4 will be described. V_QBAT represents the remaining capacity of the battery. V_ACTTRQ represents an output torque value of motor 2, which is the same as V_MOTMRQ. I_MOT represents information such as the amount of generated energy of motor 2 showing electric loading. Motor 2 generates all the electric power consumed for the vehicle, including the electric power for driving the motor.

Signals transmitted from FI/MG ECU 4 to MOT ECU 5 will be described V_CMDPWR represents an output required value to motor 2. V_ENGTRQ represents an output torque value of engine 1. I_MG represents information such as an actuation mode, assist mode and a regeneration mode with respect to motor 2.

A signal transmitted from the master power MP to FI/MG ECU 4 will be described. V_M/PNP represents a negative pressure detected value at a constant pressure chamber of the master power MP.

A signal transmitted from the positioning switch PSW to FI/MG ECU 4 will be described. An N or P is transmitted as positioning information when the positioning switch PSW selects either the N or P range.

Signals transmitted from CVT ECU 6 to CVT 3 will be described. V_DRHP represents a hydraulic pressure command value transmitted to the linear solenoid valve, which controls hydraulic pressure within the cylinder of the drive pulley at CVT 3. V_DNHP represents a hydraulic pressure command value transmitted to the linear solenoid valve, which controls hydraulic pressure within the cylinder of the driven pulley at CVT 3. The transmission gear ratio of CVT 3 is changed by V_DRHP and V_DNBP. V_SCEP represents a hydraulic pressure command value transmitted to the linear solenoid valve, which controls the hydraulic pressure of the starting clutch at CVT 3. The engaging force of the starting clutch (driving force transmission capacity) is changed by V_SCHP.

Signals transmitted from CVT ECU 6 to the braking force control unit BCU will be describe F_SOLA is a flag for the ON/OFF (close/open) of the solenoid valve SV(A) of the braking force control unit BCU (shown in FIG. 2). A 1 is provided for closing (ON) the solenoid valve SV(A), and a 0 is provided for opening (OFF) the solenoid valve SV(A). F_SOLB is a flag for the ON/OFF (close/open) of the solenoid valve SV(B) of the braking force control unit BCU (shown in FIG. 2). A 1 is provided for closing (ON) the solenoid valve SV(B), and a 0 is provided for opening (OFF) the solenoid valve SV(B).

A signal transmitted from the positioning switch PSW to CVT ECU 6 will be described. The positioning switch PSW selects the N, P, R, D or L range, and the selected range is transmitted as positioning information.

A signal transmitted from the mode switch MSW to CVT ECU 6 will be described. The mode switch MSW selects either the D (normal running mode) or S mode (sports running mode), and the selected mode is transmitted as mode information. The mode switch MSW is a mode selection switch, which works when the positioning switch PSW is set in the D range.

A signal transmitted from the brake switch BSW to FI/MG ECU 4 and 4 CVT ECU 6 will be described. F_BKSW is a flag showing whether the brake pedal BP is depressed (ON) or released (OFF). If the brake pedal BP is depressed, a 1 is provided, and if the brake pedal is released, a 0 is provided.

Signals transmitted from CVT ECU 6 to meter 10 will be described. The positioning switch PSW selects the N, P, R, D or L range, and the selected range is transmitted as positioning information. Further, the mode switch MSW selects either the D (normal running mode) or S mode (sports running mode), and the selected mode is transmitted as mode information.

Braking Force Control Unit Construction of Braking Force Control Unit

With reference to FIG. 2, the braking force control unit BCU will be described. The braking force control unit BCU includes a braking force retaining means RU which is capable of retaining braking force after the brake pedal BP is released The braking force retaining means RU continuously retains braking force after the brake pedal BP is released, and it releases the braking force after the brake pedal BP is released and in the process of increasing driving force of the vehicle to the strong condition.

As shown in FIG. 2, the braking force control unit BCU in this preferred embodiment is incorporated within the brake fluid passages FP of a hydraulically operable braking device BK. The braking force control unit BCU includes solenoid valves SV as braking force retaining means RU to switch between a communicating position, where the brake fluid passage FP connecting the master cylinder MC and the wheel cylinders WC is communicated, and a shut-off position, where the brake fluid passage FP is shut off, for retaining the brake fluid pressure within the wheel cylinders WC.

With reference to FIG. 2, the braking force control unit BCU will be described. The brake fluid pressure circuit BC of the hydraulically operable braking device BK comprises the brake fluid passage FP connecting the braking device BK to the master cylinder MC and the wheel cylinders WC. Because braking is a very important safety factor, the braking device BK has two separate systems of brake fluid pressure circuits BC(A), BC(B). Therefore, if one system is out of order, the remaining system obtains a minimum braking force.

A master cylinder piston MCP is inserted into a main body of the master cylinder MC. When the driver applies a load to the brake pedal BP, the piston MCP is pressed and pressure is applied to the brake fluid within the master cylinder MC so that mechanical force is converted into brake fluid pressure, i.e., the pressure applied to the brake fluid. When the driver releases the brake pedal BP by removing the applied load, the piston MCP is returned to the original position by the resilient action of a return spring MCS and brake fluid pressure is released. In order to have a fail-safe mechanism, two separate brake fluid pressure circuits BC are provided. For this reason, the master cylinder MC shown in FIG. 2 is a tandem master cylinder, where two pistons MCP are connected in series so that the main body of the master cylinder MC is divided into two portions.

A master power MP (brake booster) is provided between the brake pedal BP and the master cylinder MC to ease the braking effort of the driver. The master power MP shown in FIG. 2 is a vacuum servo type. The master power MP removes negative pressure from an intake manifold of engine 1 to facilitate the braking operation of the driver.

The brake fluid passage FP connects the master cylinder MC and the wheel cylinders WC. The brake fluid passage FP functions as a fluid channel for brake fluid. Brake fluid pressure generated at the master cylinder MC is transmitted to the wheel cylinders WC because the flow of the brake fluid travels through the brake fluid passage FP. When the brake fluid pressure within the wheel cylinders WC is greater, the brake fluid is transmitted from the wheel cylinders WC to the master cylinder MC through the brake fluid passage FP. Because separate brake fluid pressure circuits BC are provided for the reason mentioned above, two separate brake fluid passage systems FP are also provided. The brake fluid pressure circuit BC, such as constructed by the brake fluid passage shown in FIG. 2, is an X-piping type, where one brake fluid pressure circuit BC(A) is for braking a front right wheel and a rear left wheel, and the other brake fluid pressure circuit BC(B) is for braking a front left wheel and a rear right wheel. The brake fluid pressure circuit may be a front and rear dividing piping type, where one brake fluid pressure circuit is for braking the front wheels, and the other brake fluid pressure circuit is for braking the rear wheels.

The wheel cylinder WC is provided for each wheel 8 so that brake fluid pressure generated at the master cylinder MC and transmitted to the wheel cylinders WC through the brake fluid passage FP is converted into a mechanical force (braking force) for braking wheels 8. A piston is inserted into the wheel cylinder WC so that when the piston is pressed by the brake fluid pressure, it generates a braking force for actuating brake pads in disc brakes or brake shoes in drum brakes.

Additionally, brake fluid pressure control valves for controlling the brake fluid pressure within the wheel cylinders of the front arid rear wheels may be provided.

With reference to FIG. 2, the braking force control unit BCU will be described. The braking force control unit BCU is incorporated within the brake fluid passage FP connecting the master cylinder MC and the wheel cylinders WC and includes a solenoid valve SV as the braking force retaining means RU. The braking force control unit BCU also includes a restriction D, check valve CV and a relief valve RV, if necessary.

The solenoid valve SV is actuated by an electric signal from the control unit CU. The solenoid valve SV shuts off a flow of brake fluid within the brake fluid passage FP in its shut-off position to retain the brake fluid pressure applied to the wheel cylinders WC. A flow of brake fluid within the brake fluid passage FP is communicated when the solenoid valve SV is in a communicating position. The two solenoid valves SV(A), SV(B) shown in FIG. 2 are both in the communicating position. The solenoid valve SV prevents unintentional backward displacement of the vehicle when starting on a slope. This is because when the driver releases the brake pedal BP, brake fluid pressure is retained within the wheel cylinder WC. The term "unintentional backward displacement" means that the vehicle moves in an opposite direction due to its own weight, in other words, the vehicle begins to descend backwards on a slope.

The solenoid valve SV may be one of normally open and normally closed types. However, in order to have a fail-safe mechanism, a normally open type is preferable. This is because when electricity is cut off due to a malfunction, the brake does not work or the brake always works in a normally closed type solenoid valve SV. In the normal operation, the solenoid valve SV is shut off when the vehicle stops, and is kept in the shut-off position until the vehicle starts to move. Conditions for switching the solenoid valve SV to the shut-off position or to the communicating position will be described later.

A restriction D is provided as necessary. The restriction D always connects the master cylinder MC and the wheel cylinders WC regardless of the is conditions of the solenoid valve SV such as in the communicating position or the shut-off position. When the solenoid valve SV is in the shut-off position and the driver gradually or instantly releases the brake pedal BP, the restriction D reduces brake fluid pressure within the wheel cylinder WC at a certain speed by gradually transferring brake fluid from the wheel cylinder WC to the master cylinder MC. A restriction D may be formed by providing a flow control valve in the brake fluid passage FP. Alternatively, the restriction D may be formed at a part of the brake fluid passage FP by way of flow resistance (reduced area portion of the passage, at which a part of the section becomes narrow).

When the restriction D is provided, if the driver gradually or instantly releases the brake pedal BP, the braking force is gradually lowered so that even if the solenoid valve SV is in the shut-off position, the brake does not work permanently. In other words, the reduction speed of the brake fluid pressure within the wheel cylinder is less than that of brake pedal load applied by the driver. Therefore, even if the solenoid valve SV is in the shut-off position, the braking force is reduced after a certain period of time so that the vehicle can start to move on an up slope by the driving force of the driving motor. Meanwhile, the vehicle can start off on a down slope due to its own weight by merely releasing the brake pedal BP gradually or instantly without requiring the accelerator pedal operation of the driver.

The restriction D does not affect the braking force as long as the brake fluid pressure within the master cylinder MC due to the driver's brake pedal operation is greater than that within the wheel cylinder WC. This is because brake fluid flows based on a pressure difference between the wheel cylinder WC and the master cylinder MC, i.e. from one at a higher brake fluid pressure to the other at a lower brake fluid pressure. Unless the driver releases the brake pedal BP, the brake fluid pressure within the wheel cylinder WC does not decrease although it may increase. The restriction D may function as a check valve to prevent a counter flow from the master cylinder MC to the wheel cylinder WC.

Reduction speed of the brake fluid pressure within the wheel cylinder WC is determined to prevent the vehicle from unintentional backward displacement during the time the driver releases the brake pedal BP and the driving force is switched from the weak creep condition to the strong creep condition.

When the reduction speed of the brake fluid pressure within the wheel cylinder WC is faster, the vehicle will displace backwards on the slope before sufficient driving force will be obtained because braking force after releasing the brake pedal BP will be lost immediately even if the solenoid valve SV is closed. On the contrary, when the reduction speed of brake fluid pressure within the wheel cylinder WC is slower, the vehicle will not displace backwards on the slope after releasing the brake pedal BP because the brake is working at all times. However, extra time and driving force is required for obtaining sufficient driving force against the braking force. As described later, according to this embodiment, the solenoid valve SV is returned to the communicating position when a driving force is exerted on the vehicle and depression of the brake pedal BP is released. Therefore, when the vehicle starts by driving force, reduction speed of the brake fluid pressure within the wheel cylinder WC by way of the restriction D may be slower.

Reduction speed for reducing brake fluid pressure within the wheel cylinder WC is determined by properties of the brake fluid or the shape of the restriction D (cross section or length of the flow passage). The restriction D may be employed as an integral member with a solenoid valve SV and a check valve CV. In this case, the number of parts and installation space may be reduced.

A check valve CV is provided as necessary. The check valve CV transfers the brake fluid pressure generated within the master cylinder MC into the wheel cylinders WC when the solenoid valve SV is closed and the driver increases the brake pedal load. The check valve CV works effectively when the brake fluid pressure generated within the master cylinder MC is greater than that within the wheel cylinder WC. The check valve CV quickly increases brake fluid pressure within the wheel cylinder WC in accordance with the increased brake pedal load.

If an arrangement is employed such that the solenoid valve SV is switched from the shutoff position to the communicating position when the brake fluid pressure within the master cylinder MC becomes greater than that within the wheel cylinders WC, there is no need to provide a check valve CV because the solenoid valve SV itself responds to the increased brake pedal load.

A relief valve RV is also provided as necessary. The relief valve RV transfers brake fluid within the wheel cylinder WC into the master cylinder MC until the brake fluid pressure within the wheel cylinder becomes a certain pressure level (relief pressure) when the solenoid valve SV is in the shut-off position and the driver gradually or instantly releases the brake pedal BP. The relief valve RV works when the brake fluid pressure within the wheel cylinder WC is greater than the predetermined brake fluid pressure and the brake fluid pressure within the master cylinder MC. Therefore, even if the solenoid valve SV is in the shut-off position, extra brake fluid pressure within the wheel cylinder WC, beyond the necessary brake fluid pressure, is quickly reduced to the relief pressure. This will ensure a smooth starting operation of the vehicle even if the driver forcefully depresses the brake pedal BP more than required Providing the relief valve RV is advantageous when the vehicle starts on a down slope without assistance of driving force, for example a starting operation of the vehicle due to its own weight by releasing the brake pedal BP.

A brake switch BSW detects whether or not the brake pedal BP has been depressed Based on the detected value, the control unit CU sends instructions as to whether the solenoid valve SV should be communicated or shut off.

A servo valve (linear solenoid valve), which can optionally adjust the degree of valve opening may be employed in place of the arrangement comprising a relief valve RV and a check valve CV in addition to a solenoid valve SV.

Basic Control of Braking Force Control Unit

Conditions for basic control of the braking force control unit BCU will be described.

I) Braking force control unit BCU switches the solenoid valves SV to the communicating position when the brake pedal BP is depressed while the vehicle stops.

(1) Vehicle has to be stopped. This is a condition because the driver can not park the vehicle at desired positions if the solenoid valves SV are switched to the shut-off position while the vehicle is moving at high speeds. However, switching the solenoid valves SV to the shut-off position does not affect the driver's operation if the vehicle stops. The condition "while the vehicle stops" includes the time just before the vehicle stops.

(2) Brake pedal BP is depressed. This is a condition because no braking force is retained if the brake pedal BP is not depressed. There is no significance to switching the solenoid valve SV to the shut-off position while the brake pedal is released.

The driver can stop the vehicle securely on a slope with the brake pedal BP forcefully depressed if a condition other than the above conditions (1) and (2) is added. This condition requires that the driving force transmission capacity is in the smaller condition when the solenoid valves SV are switched to the shut-off position for retaining braking force. This leads to improved fuel consumption by the vehicle.

II) Braking force retaining means RU releases the braking force (i.e. the solenoid valves SV are returned to the communicating position) after the brake pedal BP is released and in the process of increasing the driving force to the strong condition.

(1) Brake pedal BP is released. This is a condition because the driver intends to start the vehicle when depression of the brake pedal BP is released.

(2) Driving force is in the process of increasing to the strong condition (creep rising condition). This is a condition because the driver may experience a sudden start of the vehicle if the braking force is released when the driving force reaches the strong condition (strong creep condition). This is more prominent on a down slope because the vehicle's own weight also affects the driving force of the vehicle.

However, a smooth starting operation of the vehicle without a sudden start on a down slope is achieved by increasing the driving force if the braking force is released after releasing the brake pedal BP and in the process of increasing driving force to the strong condition. There may be a concern that the vehicle displaces backwards on an up slope if the braking force is released in the process of increasing the driving force to the strong condition. However, backward displacement of the vehicle on the slope is prevented by the inertial force and the rolling resistance (increasing driving force) of the vehicle.

The retained braking force restricts backward displacement of the vehicle until the braking force retention is released after releasing the brake pedal BP. Thereafter, the inertial force of the vehicle and the like restrict the backward displacement until the driving force reaches the strong condition (creep rising condition). As a result, because the driving force increases to the strong condition while backward displacement of the vehicle is restricted, a smooth starting operation of the vehicle is achieved.

The process of increasing the driving force to the strong condition includes any point in time after the driving force occurs and before the driving force reaches the strong condition. However, when a small driving force is obtained, releasing the braking force may cause backward displacement of the vehicle on an up slope, although it is advantageous on a down slope. Meanwhile, when a greater driving force is obtained, releasing the braking force may cause a sudden start of the vehicle on a down slope, although it is advantageous on an up slope. The tiring at which the release of the braking force is carried out should be determined with consideration of the inertial force and the rolling resistance of the vehicle, as well as in comparing the advantages and disadvantages of the slope. This will be described later in the Requirement for Creep Rising Condition section.

With reference to FIGS. 3 to 9, control of the vehicle will be described in greater details.

Conditions for Retaining Braking Force

Figure 3A:
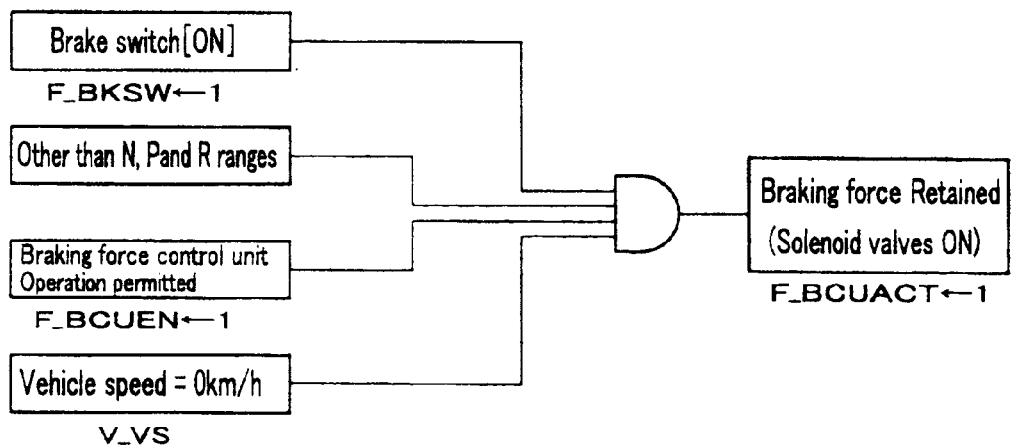
FIG. 3A shows the logic for retaining braking force.

Conditions for retaining the braking force by the braking force control unit BCU will be described below. As shown in FIG. 3A, the braking force is retained when all of the following four conditions are satisfied.

I) Brake switch BSW is ON.

II) Positioning switch PSW selects other than Neutral (N range), parking (P range) and Reverse (R range).

III) Operation of the braking force control unit BCU is permitted.

IV) Vehicle speed is 0 km/h.

When all the above conditions are satisfied, both solenoid valves SV(A), SV(B) are switched to the shut-off position, thereby retaining the braking force.

The above four conditions will be described below.

I) Brake switch BSW is ON. This is a condition because no braking force or a small braking force will be retained within the wheel cylinders WC.

II) Positioning switch PSW selects other than Neutral (N range), parking (P range) and Reverse (R range). This is a condition for canceling unnecessary operation of the braking force control unit BCU in the N or R range, and in the R range, for preventing the vehicle from unintentional backward displacement with the aid of the driving force in the strong creep condition because the strong creep condition is kept in the R range. Therefore, the braking force is retained while the D (driving range) or L range (low range) is selected.

III) Operation of the braking force control unit BCU is permitted. This condition is for reminding the driver to sufficiently depress the brake pedal BP before retaining the braking force, thereby preventing unintentional backward displacement of the vehicle. Because sufficient driving force is obtained in the strong creep condition so that the vehicle can stand still on a slope at an inclination angle of 5 degrees, the driver often depresses the brake pedal BP insufficiently. In this situation, if the solenoid valves SV are closed and engine 1 is stopped, the vehicle will unintentionally displace backwards. Meanwhile, in the weak creep condition and the middle creep condition, the driving force is not sufficient for keeping the vehicle stationary on a slope having an inclination angle of 5 degrees. When the driving force is decreased on a slope, the driver forcefully depresses the brake pedal BP. This ensures sufficient braking force to prevent the vehicle from backward displacing on the slope, even if the driving force is decreased or lost. The control logic for permitting an operation of the braking force control unit BCU will be described later.

IV) Vehicle speed is 0 km/h. This is a condition because the driver can not select a position for parking the vehicle if the solenoid valves SV are switched to the shut-off position while the vehicle is running.

Meanwhile, because the vehicle stops when the vehicle speed is 0 km/h, the braking force can be retained without causing any trouble in the driving operation. "Vehicle speed of 0 km/h" also includes a condition just before the vehicle stops.

Conditions Required for Permitting Operation of the Braking Force Control Unit

Figure 3B:
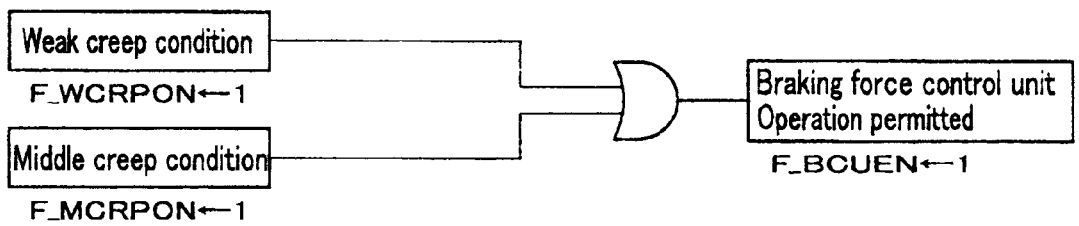
FIG. 3B shows the logic for permitting an operation of the braking force retaining unit.

With reference to FIG. 3B, conditions required for permitting an operation of the braking force control unit BCU will be described. An operation of the braking force control unit BCU is permitted while the driving force is either in the weak creep condition or in the middle creep condition. In the weak creep condition and the middle creep condition, the driving force is not sufficient for keeping the vehicle stationary on a slope having an inclination angle of 5 degrees. Therefore, the driver is forced to depress the brake pedal BP sufficiently before the retaining braking force to obtain sufficient driving force for preventing backward displacement of the vehicle. The driving force in the weak creep condition or in the middle creep condition is determined based on a hydraulic pressure command value to a linear solenoid valve of CVT 3, where the engagement the hydraulic pressure of the starting clutch is controlled.

Conditions Required for Weak Creep Order

Figure 4A:
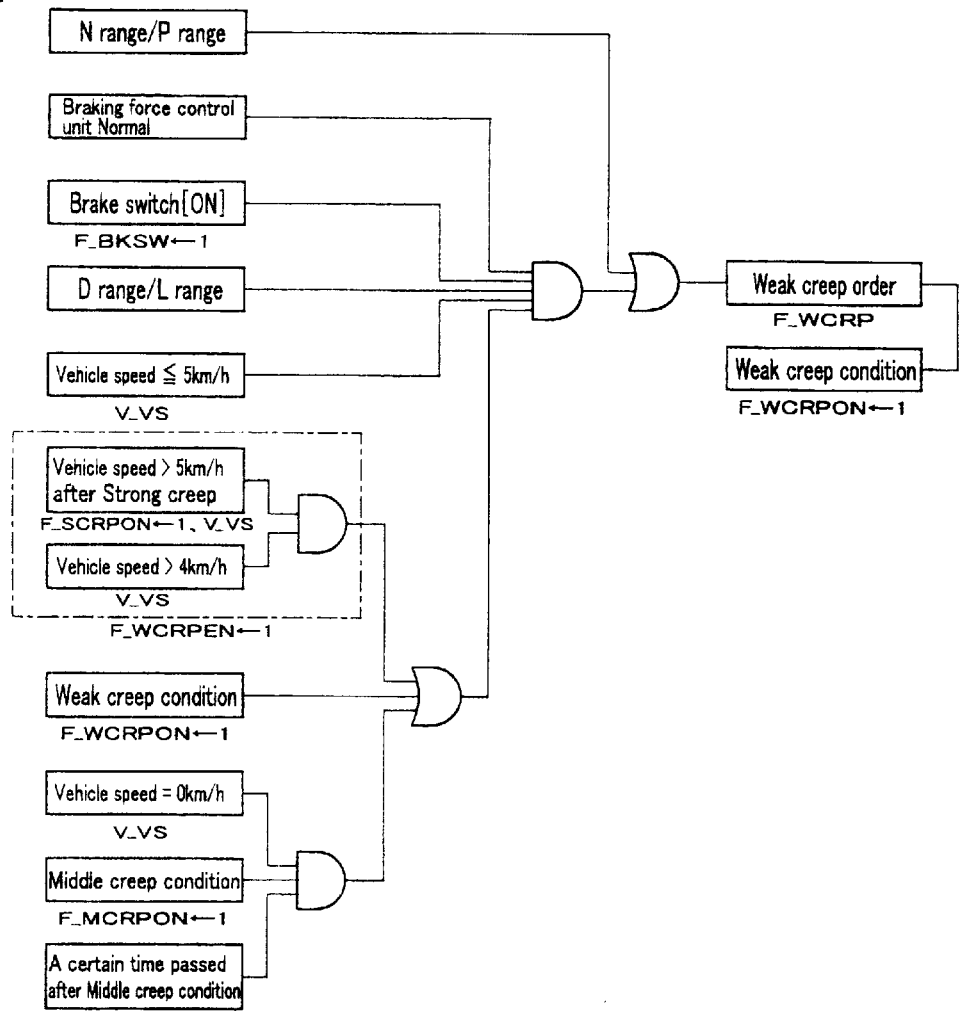
FIG. 4A shows the control logic for switching to a weak creep condition.

Conditions for transmitting a weak creep order will be described. As shown in FIG. 4A, the weak creep order (F_WCRP) is transmitted when any of the following conditions I) and II) is satisfied. The conditions are:

I) Positioning switch PSW selects the N or P range

II) The following two conditions are both satisfied:
    A. (1) Braking force control unit BCU is normal;
        (2) Brake switch BSW is ON;
        (3) Positioning switch PSW selects an advance range
            (D range/L range); and (4) Vehicle speed is at 5 km/h or lower; and D. (5) Vehicle speed after switching to the strong creep condition >5 km/h and vehicle speed >4 km/h; or (6) Driving force is in the weak creep condition; or (7) Vehicle speed is 0 km/h, Driving force is in the middle creep condition, and a certain time has passed after switching to the middle creep condition.

When one of the above conditions I) and II) is satisfied, the weak creep order is transmitted and the driving force is switched to the weak creep condition. The above conditions are determined at the driving force decreasing unit DDU. The reason for switching the driving force to the weak creep condition is to improve the vehicle's fuel consumption. When on a slope, it is for reminding the driver to forcefully depress the brake pedal BP to prevent backward displacement of the vehicle while the vehicle stops on the slope. When on a flat surface, the driver can stop the vehicle with a weaker braking force because the driving force is weak in the weak creep condition. Therefore, in the weak creep condition, the depression force of the brake pedal BP by the driver is lessened.

The conditions for transmitting the weak creep order will be described.

I) Positioning switch PSW selects the N or P range. This is a condition because if the transmission is selected from a non-driving range (N/P range) to a driving range (D/L/R range) and at the same time the accelerator pedal is quickly depressed, the driving force transmission capacity of the starting clutch can be instantly increased, allowing a smooth starting operation of the vehicle. In the weak creep condition, because pressure oil has been filled in an oil pressure chamber of the starting clutch, there is no clearance or play for the advance stroke of the piston enforcing the clutch. Therefore, the driving force transmission capacity is instantly increased by increasing the pressure value of the pressure oil.

Driving force is switched to the weak creep condition when the transmission is switched to the N or P range. This is for previously changing the driving force transmission capacity of the starting clutch to the capacity at the weak creep condition. However, the driving force from engine 1 is not transmitted to driving wheels 8. This is distinguished from the weak creep condition while the transmission is set in the D/L range. In the N/P range, the connection between engine 1 and driving wheels 8 is completely cut by a forward/reverse movement switching mechanism arranged in series with the starting clutch on a driving force transmission path. Because neither a transmission path for the forward movement nor a transmission path for the reverse movement is provided in the N/P range, the driving force from engine 1 is not transmitted to driving wheels 8.

II) Conditions (1) to (4) are basic requirements for switching to the weak creep condition. Conditions (5) to (7) indicate the conditions of the vehicle before switching to the weak creep condition.

(1) Braking force control unit BCU is normal. This is a condition because the braking force is not retained if the braking force control unit BCU is out of order. Because sufficient driving force is not obtained in the weak creep condition, the vehicle will displace backwards on a slope. If the weak creep order is transmitted and driving force is switched to the weak creep condition regardless of abnormal conditions of the vehicle, e.g., the solenoid valve SV is not switched to the shut-off position, brake fluid pressure is not retained within the wheel cylinders WC (braking force is not retained) when the brake pedal BP is released. Therefore, if the driver releases the brake pedal BP when starting on the slope, the braking force is suddenly lost and the vehicle displaces backwards. Therefore, smooth starting operation without unintentional backward displacement of the vehicle is achieved by the strong creep condition.

(2) Brake switch BSW is ON. This is a condition because the driver does not intend to reduce the driving force.

(3) Positioning switch PSW selects an advance range (D/L range). This is a condition for improving the vehicle's fuel consumption while an advance range is selected. When the positioning switch PSW selects the D range, the driving force is switched to the weak creep condition, notwithstanding the position (D mode/S mode) of the mode switch MSW. However, in the R range, the driving force is not switched to the weak creep condition. This is for facilitating the steering operation of the vehicle at a garage with the vehicle kept in the strong creep condition.

(4) The vehicle speed is at 5 km/h or lower. This is a condition because the driving force of the driving wheels 8 is transmitted to engine 1 or motor 2 through the starting clutch of CVT 3 to obtain engine brake or carry out regenerative power generation by motor 2.

(5) Vehicle speed after switching to the strong creep condition >5 km/h and Vehicle speed >4km/h. This is a condition because switching to the weak creep condition is carried out solely by deceleration due to continued brake application. Because the difference of the driving force is greater between the strong creep condition and the weak creep condition, the driver may experience unintentional strong deceleration if the driving force is switched from the strong creep condition to the weak creep condition when the brake pedal BP is depressed. Also, the vehicle may momentarily displace backwards if the vehicle stops on a slope. In such a circumstance, it is preferable not to carry out the switching operation from the strong creep condition to the weak creep condition. Therefore, once switched to the strong creep condition, the driving force is not changed to the weak creep condition until the throttle is OFF (depression of the accelerator pedal is released) over the vehicle speed of 5 km/h and the driving force is switched to the strong creep condition for driving.

The vehicle speed may decrease to 5 km/h, after being switched to the strong creep condition, without depressing the brake pedal BP even if the vehicle has sped up once over 5 km/h and then the driving force is decreased (strong creep condition for driving). For example, when the vehicle moves on an up slope, the vehicle speed may decrease without depressing the brake pedal BP. In that case, because the brake switch BSW is OFF, the driving force is switched to the strong creep condition when the vehicle speed decreases to 5 km/h. In order to cancel a successive switching operation from the strong creep condition to the weak creep condition, a further condition, i.e., vehicle speed >4 km/h is required. The switching operation to the weak creep condition is not carried out unless the brake pedal BP is depressed when the vehicle speed again decreases to 5 km/h. If the brake pedal BP is depressed (brake switch BSW [ON]) when the vehicle speed again decreases to 5 Km/h, the driving force is switched from the strong creep condition for driving to the weak creep condition. In other words, if driving force is not changed to the weak creep condition when the vehicle speed again decreases to 5 km/h (vehicle speed=5 km/h), the strong creep condition is retained as long as the vehicle speed is at or below 5 km/h.

(6) Driving force is in the weak creep condition. This is a condition because once switched to the weak creep condition, the weak creep condition is retained regardless of conditions (5) and (7). According to condition (5), the driving force is switched to the weak creep condition when the vehicle speed becomes 5 km/h. However, if the vehicle speed is less than 5 km/h, condition (5) is not satisfied. The weak creep condition is not retained solely by condition (5) if the vehicle speed is under 5 km/h. As a result, "the driving force is in the weak creep condition" is required to retain the weak creep condition when the vehicle speed under 5 km/h.

(7) Vehicle speed is 0 km/h, driving force is in the middle creep condition, and a certain time has passed after switching to the middle creep condition. This is a condition because deteriorated fuel consumption and vehicle body vibration, while the vehicle stops in the strong creep condition, are prevented with the driving force switched to the weak creep condition. The strong creep condition is retained if the driving force is not changed to the weak creep condition when the vehicle speed again decreases to 5 km/h (vehicle speed=5 km/h) (based on condition (5)), or if the vehicle speed at or below 5 km/h is retained after switching to the strong creep condition by way of releasing the brake pedal BP while being in the weak creep condition. However, if the vehicle stops in the strong creep condition with the brake pedal depressed, fuel consumption deteriorates and vehicle vibration remains. For this reason, when the vehicle stops completely (vehicle speed=0 km/h), the driving force is switched to the middle creep condition, in which driving force is between the strong creep condition and the weak creep condition, and thereafter, if a certain time has passed (300 msec in this embodiment), the driving force is further switched to the weak creep condition. Because the braking force due to depressing the brake pedal BP increases while the driving force is stepwise reduced from the strong creep condition to the middle creep condition and farther to the weak creep condition, the momentary displacement of the vehicle on an up slope is made as small as possible.

Conditions Required for Strong Creep Condition for Driving

Figure 4B:
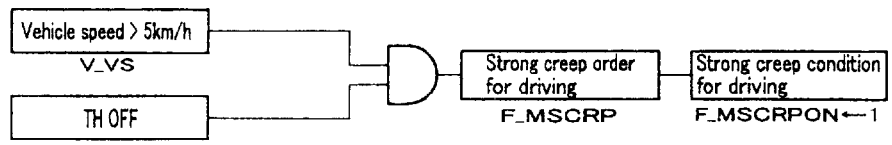
FIG. 4B shows the control logic for switching to a strong creep condition for driving.

Conditions required for strong creep condition for driving will be described. A strong creep order for driving (F_MSCRP) is transmitted when both of the following two conditions I) and II) are satisfied (FIG. 4B). The creep diving force is switched to the strong creep condition for driving after the strong creep order for driving is transmitted.

I) Vehicle speed >5 km/h.

II) Throttle is OFF (depression of the accelerator pedal is released).

These conditions are determined at the driving force decreasing unit DDU. One reason for switching the driving force to the strong creep condition for driving is to prevent a strong deceleration of the vehicle before stopping due to the switching operation from the strong creep condition to the weak creep condition. Another reason is to prevent momentary backward displacement of the vehicle on an up slope while the vehicle stops. The driving force is switched to the strong creep condition for driving, which is weaker than the strong creep condition, in advance of switching to the weak creep condition.

Each of the above conditions will be described.

I) Vehicle speed >5 km/h. This is a condition because the switching operation from the strong creep condition to the weak creep condition is carried out when the vehicle speed is once over 5 km/h after the strong creep condition and then the vehicle speed becomes 5 km/h. This is also for discriminating between the strong creep condition at a vehicle speed of 5 km/h or lower and the strong creep condition for driving over the vehicle speed of 5 km/h.

II) Throttle is OFF (TH OFF). This is a condition because the driver does not intend a further increment of the driving force, the driving force may be decreased without any problems.

Conditions Required for Middle Creep Condition

Figure 4C:
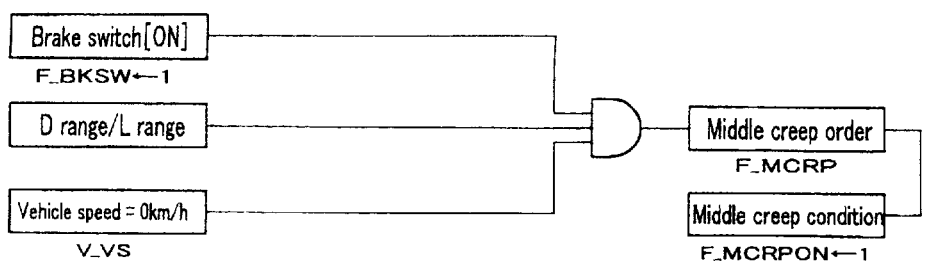
FIG. 4C shows the control logic for switching to a middle creep condition.

Conditions required for the middle creep condition will be described. As shown in FIG. 4C, when the following three conditions I), II) and III) are satisfied, a middle creep order (F_MCRP) is transmitted.

I) Brake switch BSW is ON.

II) Positioning switch PSW selects an advance range (D/L range).

III) Vehicle is stopped (vehicle speed=0 km/h).

These conditions are determined at the driving forte decreasing unit DDU. The strong creep condition is retained if the driving force is not changed to the weak creep condition when the vehicle speed decreases again to 5 km/h (vehicle speed=5 km/h) or if the vehicle speed at 5 km/h or lower is retained after switching to the strong creep condition by releasing the brake pedal BP while being in the weak creep condition. However, if the vehicle continues to stop in the strong creep condition, fuel consumption deteriorates and vehicle vibration continues. For this reason, the middle creep condition is required. As previously mentioned, in order to prevent momentary backward displacement of the vehicle, which is due to switching from the strong creep condition to the weak creep condition while the vehicle stops, the driving force is switched to the middle creep condition.

The above conditions required for the middle creep order will be described.

I) Brake switch BSW is ON. This is a condition because the driver does not intend to reduce the driving force when the brake pedal BP is not depressed.

II) Positioning switch PSW selects an advance range (D/L range). This is a condition for switching to the middle creep condition while an advance range is selected because the driving force is switched to the weak creep condition while the positioning switch is set to the D or L range. Switching to the middle creep condition is not necessary in the N/P range because the weak creep condition is selected as soon as the transmission is switched. Also, switching to the middle creep condition is not necessary in the R range because the strong creep condition is retained in the R range.

III) Vehicle is stopped (vehicle speed=0 km/h). This is a condition because the driving force is switched to the weak creep condition in order to prevent deteriorated fuel consumption and vehicle vibration while the vehicle stops in the strong creep condition. The middle creep condition is required as a transitional condition to the weak creep condition.

A determination of whether or not the driving force is in the weak creep condition, strong creep condition for driving or the middle creep condition, is made based on the hydraulic pressure command value to the starting clutch of CVT 3.

Conditions for Automatically Stopping the Engine

Figure 5:
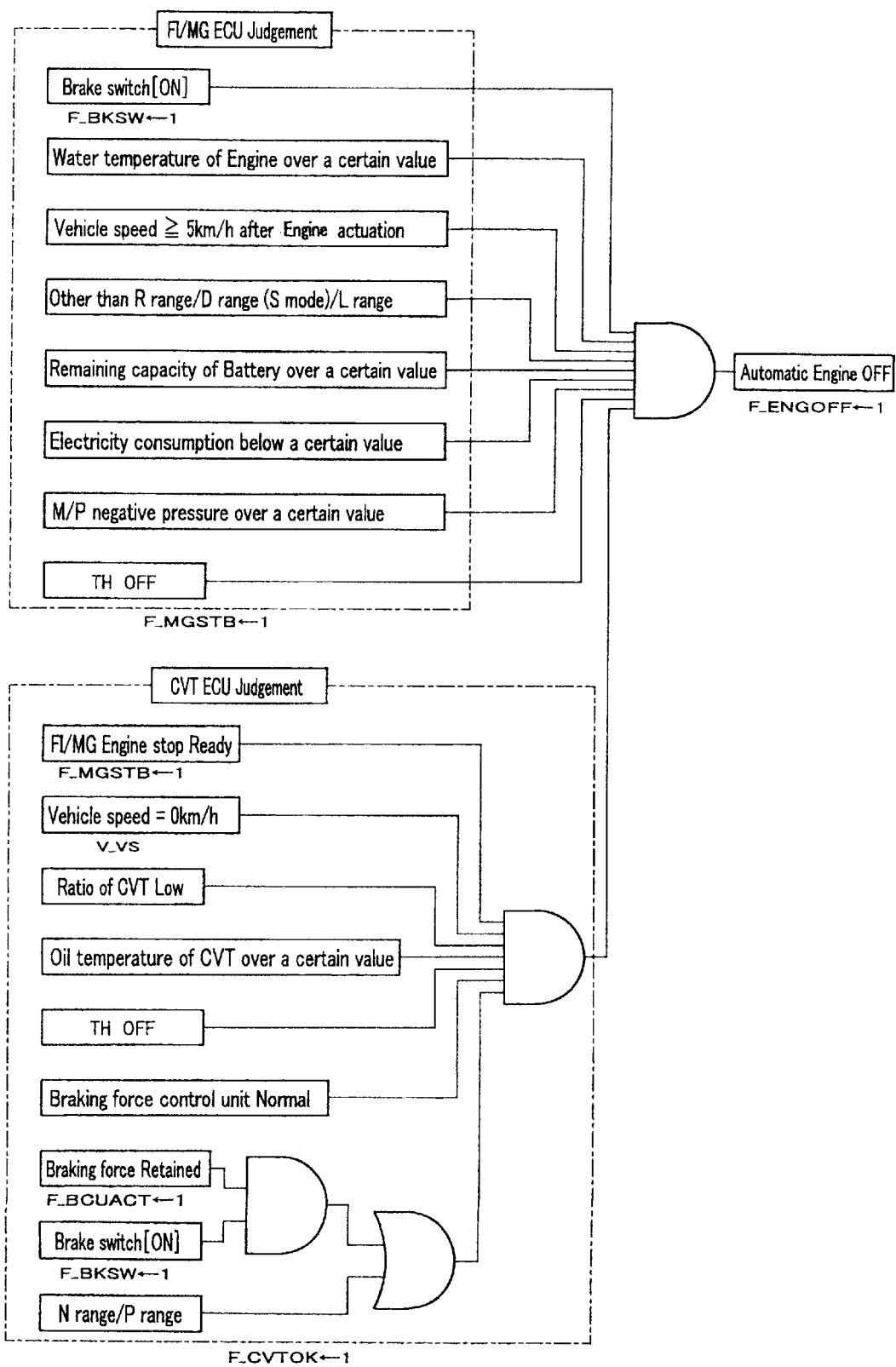
FIG. 5 shows the control logic of a driving motor stopping unit, in which the engine is automatically stopped.

For the purpose of further improving fuel consumption, engine 1 is automatically stopped while the vehicle stops. Conditions for automatically stopping engine 1 will be described. When all the conditions shown in FIG. 5 are satisfied, an engine stop order (F_ENGOFF) is transmitted and engine 1 is automatically stopped. The automatic engine stop operation of engine 1 is carried out by the driving motor stopping unit. Therefore, the following automatic engine stop conditions are determined at the driving motor stopping unit Specifically, the automatic engine stop conditions are determined at FI/MG ECU 4 and CVT ECU 6. When FI/MG ECU 4 determines that all the following conditions I) to VIII) are satisfied, F_MGSTB becomes 1. When CVT ECU 6 determines that all the following conditions IX) to XV) are satisfied, F_CVTOK becomes 1.

Each of the automatic engine stop conditions will be described.

I) Brake switch BSW is ON. This is a condition for warning the driver. The driver places his foot on the brake pedal BP when the brake switch BSW is ON. Therefore, if engine 1 is stopped and the driving force is lost the driver can easily increase a brake pedal load before the vehicle unintentionally displaces backwards on a slope.

II) Water temperature of the engine is over a certain value. This is a condition because the stop/actuation operation of engine 1 should be carried out when engine 1 is in stable conditions. In a cold area, if the water to temperature is low, engine 1 may not restart.

III) Vehicle speed reaches 5 km/h once after engine actuation. This is a condition for facilitating a steering operation at a garage while the vehicle moves in creep running. The steering operation at a garage will be time-consuming if engine 1 is stopped whenever the vehicle stops for changing steering directions.

IV) Positioning switch PSW and Mode switch MSW select other than the R range/D range (S mode)/L range, i.e., the N range/D range (D mode)/P range is selected. This is a condition for the following reasons. A steering operation at a garage while selecting the R or L range will be time-consuming if engine 1 is stopped whenever the vehicle stops for changing steering directions. When the positioning switch PSW selects the D range and the mode switch MSW selects S the mode, the driver is expecting the vehicle to perform a quick start operation.

V) Capacity of the battery is over a certain value. This is a condition because if the remaining capacity of the battery is not enough to restart engine 1, the motor cannot actuate engine 1 after stopping the engine.

VI) Electricity consumption is below a certain value. This is a condition for securing sufficient electrical supply to loads.

VII) Load of the constant pressure chamber of the master power MP is over a certain value. This is a condition because the smaller negative pressure in the constant pressure chamber of the master power MP, the smaller amplification of the brake load when depressing the brake pedal BP, leads to deteriorated braking performance. Because negative pressure in the constant pressure chamber is obtained from the intake pipe of engine 1, negative pressure in the constant pressure chamber becomes far smaller if engine 1 is stopped at smaller negative pressures. This leads to reduced amplification of the brake load when the driver depresses the brake pedal BP, and hence results in deteriorated braking performance.

VIII) Accelerator pedal is not depressed (TH OFF). This is a condition because the driver does not intend further increase of the driving force, engine 1 may be automatically stopped.

IX) All the automatic engine stop conditions at FI/MG ECU 4 are satisfied. This is a condition because if all the engine stop conditions determined at FI/MG ECU 4 are not satisfied, it is not preferable to carry out the automatic engine stop operation.

X) Vehicle speed is 0 km/h. This is a condition because the driving force is not required when the vehicle stops. The vehicle speed is detected by a vehicle speed sensor and an ECU calculating the vehicle speed from the obtained vehicle speed sensor information. For this reason, according to the detectability of the vehicle speed sensor or throughput of the ECU, accuracy of the detected vehicle speed is determined. For example, if the vehicle speed sensor cannot detect a minimum vehicle speed less than 1 km/h, the detected vehicle speed is 0 km/h, notwithstanding that the vehicle actually moves with a vehicle speed of less than 1 km/h. Detected vehicle speed of 0 km/h also includes extremely slow running speed of the vehicle before the vehicle stops completely.

XI) Ratio of the CVT is low. This is a condition because a smooth starting operation of the vehicle is not carried out unless the ratio of the CVT (pulley ratio) is low.

XII) Oil temperature of the CVT is over a certain value. This is a condition because if the oil temperature of the CVT 3 is low, the start-up for hydraulic pressure of the starting clutch will cause a delay. Therefore, the required time from the engine actuation to the strong creep condition is extended, and the vehicle will displace backwards on a slope.

XIII) Accelerator pedal is not depressed (TH OFF). This is a condition because if the driver does not intend the further increment the driving force, engine 1 may be automatically stopped.

XIV) Braking force control unit BCU is normal. This is a condition because the braking force may not be retained if the braking force control unit BCU is out of order, therefore, the strong creep condition is kept for preventing the vehicle from unintentional backward displacement.

XV) (1) Braking force is retained (solenoid valve SV in shut-off position) and Brake switch BSW is ON or (2)Positioning switch PSW selects N range/P range. This is a condition for the following reasons:

(1) As long as the braking force is retained, the vehicle does not displace backwards on a slope even if engine 1 is automatically stopped and the driving force is lost. Further, when the brake switch BSW is ON, the driver places his foot on the brake pedal BP. Therefore, if engine 1 is stopped and the driving force is lost, the driver can easily increase a brake pedal load before the vehicle unintentionally displaces backwards on a slope.

(2) If the vehicle stops with the positioning switch PSW selecting the P or N range, the driver intends to pull up the vehicle. Therefore, engine 1 may be automatically stopped. In this condition, engine 1 is automatically stopped even if the braking force control unit BCU is not actuated.

The automatic engine stop conditions include conditions required for the weak creep order. In other words, the automatic engine stop conditions are not satisfied as long as the conditions for the weak creep order are not satisfied. Further, in the automatic engine stop conditions, engine 1 is automatically stopped when the vehicle speed is 0 km/h. Meanwhile, in the conditions required for the weak creep order, the driving force is decreased to the weak creep condition when the vehicle speed is 5 km/h. For this reason, the driving motor stopping unit automatically stops engine 1 after the driving force decreasing unit DDU decreases the driving force to the weak creep condition at the vehicle speed of 5 km/h and the vehicle speed falls to 0 km/h.

Conditions for Releasing Braking Force

Figure 6A:
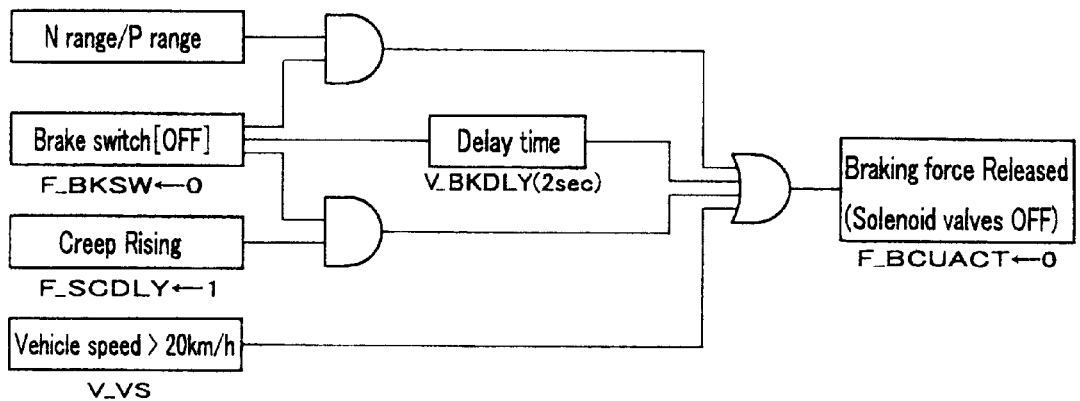
FIG. 6A shows the control logic for releasing braking force to be retained.

Conditions under which the braking force control unit BCU releases the braking force will be described. As shown in FIG. 6A, the braking force is released when any of the following conditions is satisfied:

I) Positioning switch PSW selects N range)P range and Brake switch BSW is OFF;

II) A certain delay time has passed after Brake switch BSW becomes OFF;

III) Creep driving force has risen and Brake switch BSW is OFF; or

IV) Vehicle speed is over 20 km/h.

When any of the above conditions is satisfied, the solenoid valves SV are switched to the communicating position for releasing the retained braking force.

Each of the above conditions will be described.

I) Positioning switch PSW selects N/P range and Brake switch BSW is OFF. This is a condition for eliminating unnecessary operation of the braking force control unit BCU.

II) A certain delay time has passed after Brake switch BSW becomes OFF. This is a condition because it is not preferable, as a fail-safe measure that the braking force be permanently retained after releasing the brake pedal BP because brake dragging occurs. In the preferred embodiment, the delay time is about 2 seconds after releasing the brake pedal BP, i.e. after the brake switch BSW is OFF.

III) Creep driving force has risen and Brake switch BSW is OFF. This is a condition because in this condition, the driving force is in the process of increasing to the strong creep condition. However, taking into consideration the inertial force and the rolling resistance (increasing driving force) of the vehicle, unintentional backward displacement of the vehicle on an up slope is reduced. The driver can also start the vehicle on a down slope without sudden impact.

IV) Vehicle speed is over 20 km/h. This is a condition for eliminating unnecessary brake dragging as a fail-safe measure.

Requirement for Creep Rising Condition

Figure 6B:
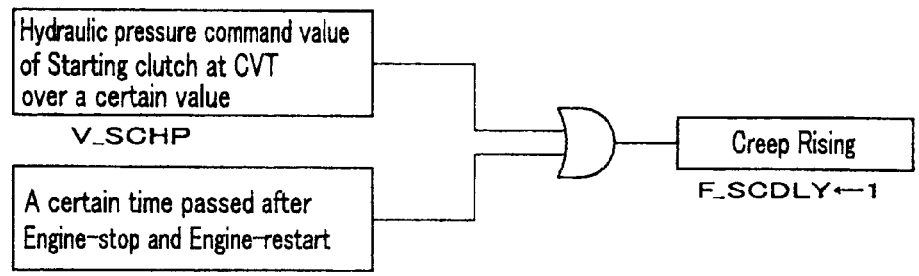
FIG. 6B shows the control logic for determining a creep rising condition.

The requirement for a creep rising condition will be described As shown in FIG. 6B, when any of the following conditions 1) and II) is satisfied, the creep diving force is considered to have risen.

I) Hydraulic pressure command value of the starting clutch at CVT 3 is over a certain value.

II) A certain time has passed after engine 1 is automatically stopped and then restarted.

These two conditions are determined at the driving force decreasing unit DDU. In the creep rising condition, the driving force has been increased to such an extent that backward displacement of the vehicle on a slope is prevented, taking into consideration the inertial force and the rolling resistance (increasing driving force) of the vehicle. Therefore, even if the actuation of the braking force control unit BCU is released and the braking force is lost, backward displacement of the vehicle is prevented. The creep rising condition also includes a condition allowing slight backward displacement of the vehicle, as long as the increasing driving force minimizes the backward displacement of the vehicle.

The above conditions required for the creep rising condition will be described.

I) Hydraulic pressure command value of the staring clutch at CVT3 is over a certain value. This is a condition because when the hydraulic pressure command value of the starting clutch at CVT 3 is over a certain value, the driving force has been increased to such an extent that backward displacement of the vehicle is prevented for the reason mentioned above. Therefore, backward displacement of the vehicle is prevented even if braking force is fax released. The driver can also start the vehicle on a down slope without sudden impact. "The hydraulic pressure command value over a certain value" indicates that the hydraulic pressure command value—it is transmitted to the linear solenoid valve, which controls hydraulic pressure for the engaging force of the starting clutch—has been increasing substantially to a value halfway between the weak creep condition and the strong creep condition, in the process of switching from the weak creep condition to the strong creep condition.

II) A certain time has passed after the engine 1 is automatically stopped and then restarted. This is a condition because the driving force has been increased to such an extent that backward displacement of the vehicle is prevented for the reason mentioned above, even after releasing the retained braking force. This also ensures a smooth starting operation of the vehicle on a down slope without sudden impact. Time-counting is initiated when engine 1 is automatically restarted and the supply of pressure oil to the starting clutch is started. Hydraulic oil has been discharged from the oil pressure chamber of the starting clutch at CVT 3 while engine 1 is stopped. Therefore, a clearance or play exists for the advance stroke of the piston enforcing the clutch when engine 1 is actuated and supply of the pressure oil is initiated. For this reason, the hydraulic pressure command value to the linear solenoid valve of the starting clutch does not correspond to the actual hydraulic pressure value (driving force transmission capacity). When increasing the driving force from the engine stop condition, it is impossible to judge the creep rising condition based on the hydraulic pressure command value of the starting clutch. As a result, the creep rising condition is determined when a timer counts a certain period of time after the supply of the pressure oil to the starting clutch is initiated.

Conditions Required for Strong Creep Order

Figure 7A:
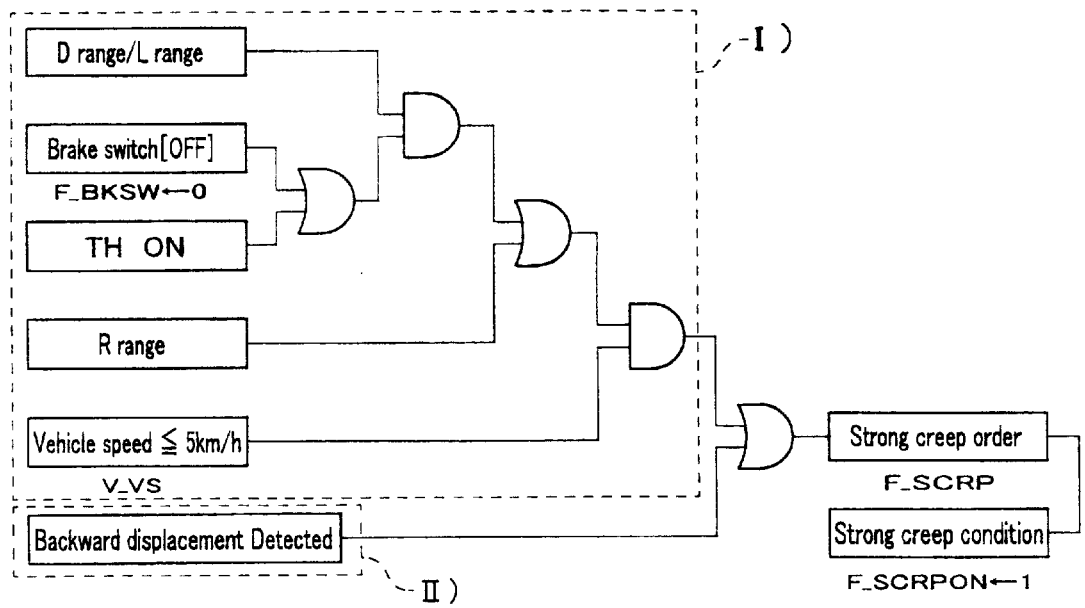
FIGS. 7A and 7B show the control logic for switching to the strong creep condition. Here.
Figure 7B:
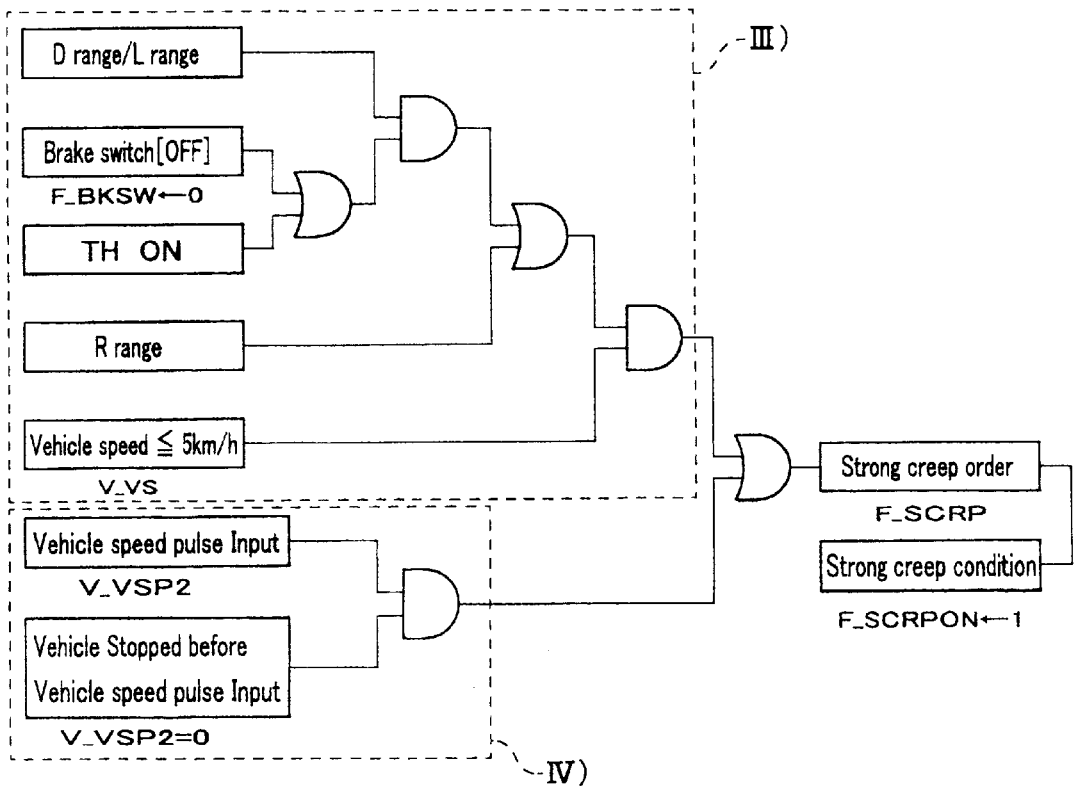

Conditions for a strong creep order will be described. The strong creep order (F_SCRP) is transmitted when any of the following two conditions shown in FIGS. 7A and 7B is satisfied. The first condition required for the strong creep order is that either I) or II) is satisfied (FIG. 7A).

I) [(1) Brake switch is OFF or Throttle is ON, and Positioning switch PSW selects an advance range (D/L rage) or (2) Positioning switch PSW selects the reverse (R) range] and (3) Vehicle speed is at 5 km/h or lower.

II) Backward displacement of the vehicle is detected.

Meanwhile, the second condition required for the strong creep order is that either III) or IV) is satisfied (FIG. 7B).

III) [(1)Brake switch is OFF or Throttle is ON, and Positioning switch PSW selects an advance range (D/L range) or (2) Positioning switch PSW selects the reverse (R) range) and (3) Vehicle speed is at 5 km/h or lower.

IV) Vehicle speed pulse is input and Vehicle is fully stopped before the input of vehicle speed pulse.

In the first and the second conditions required for the strong creep order, I) and III) are identical, while II) and IV) are different. Therefore, explanation of the condition III) is omitted. Conditions I) to IV) are determined at the driving force decreasing unit DDU.

Each of the above conditions will be described below.

First, (1) to (3) of condition 1) will be described. However, because they are identical to those of the condition E), an explanation is omitted with regard to (1) to (3) of condition III).

(1) Brake switch is OFF or Throttle is ON, and Positioning switch PSW selects an advance range (D/L rage). This is a condition because when the driver initiates a starting operation, the driving force is changed to the strong creep condition. The driver intends to start the vehicle because the positioning switch PSW is set to the D or L range and further depression of the brake pedal BP is released or instead, the accelerator pedal is depressed. Therefore, the driving force is switched from the weak creep condition to the strong creep condition.

When the accelerator pedal is depressed, the driving force transmission capacity increases, even after reaching the greater driving force transmission capacity, to a capacity that allows transmission of all the driving force generated at the driving motor (condition greater than the greater driving force transmission capacity). However, the flag indicating the strong creep condition (F_SCRPON) is kept until another flag rises.

(2) Positioning switch PSW selects the reverse (R)range. This is a condition for ensuring smooth creep driving in R range. When the positioning switch PSW is set to the R range, the driver expects a steering operation at a garage with the driving force switched to the strong creep condition. Therefore, the driving force is switched from the weak creep condition to the strong creep condition.

(3) Vehicle speed at 5 km/h or lower. This is a condition because the strong creep condition for driving at a vehicle speed over 5 km/h can be distinguished from the strong creep condition at a vehicle speed of 5 km/h or lower.

II) Backward displacement of the vehicle is detected. When the vehicle starts to displace backwards on a steep slope with the backward displacement force derived from the vehicle's own weight being greater than the braking force, the driving force in the strong creep condition prevents the backward displacement of the vehicle. When the vehicle stops on an up slope, the total amount of the driving force in the weak creep condition (driving force is zero if engine 1 is automatically stopped) and the braking force resists the backward displacement force of the vehicle. However, because the greater the inclination angle of the slope, the greater backward displacement force, the vehicle starts to displace backwards on the steep slope with the backward displacement force being greater than the total amount of the driving force in the weak creep condition and the braking force. For this reason, when backward displacement of the vehicle is detected, the driving force is switched from the weak creep condition to the strong creep condition in any circumstances to generate sufficient driving force against the slope.

Figure 9A:
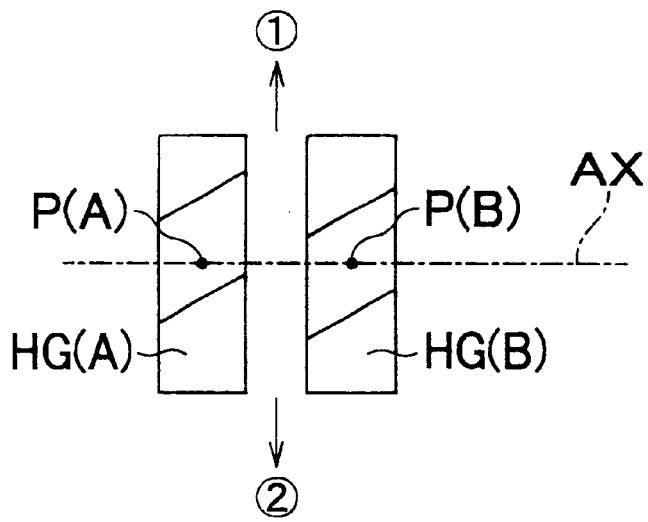
FIG. 9A shows a construction thereof.
Figure 9B:
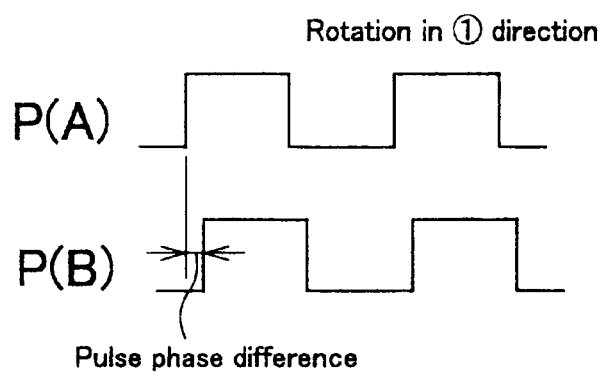
FIG. 9B shows a pulse phase for direction of FIG. 9A.
Figure 9C:
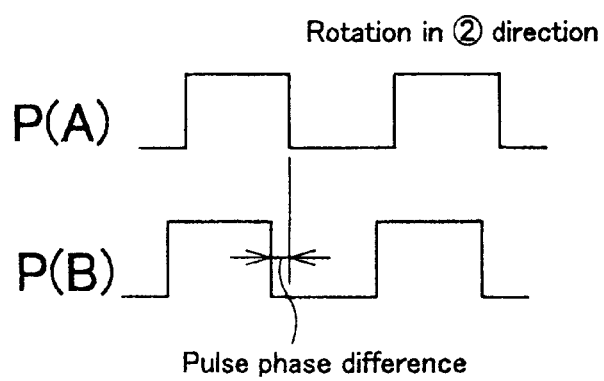
FIG. 9C shows a pulse phase for direction of FIG. 9B.

With reference to FIG. 9, means for detecting backward displacement of the vehicle will be described. For example, helical gears HG(A), HG(B) are provided downstream of the starting clutch of CVT 3. The helical gears HG(A), HG(B) may be provided at any positions as long as they are rotatable with the tires. As shown in FIG. 9A, gear teeth of the helical gears HG(A), HG(B) are positioned in helical and diagonal relation around the periphery of the gear. The phase of the gear teeth shifts with the rotation of the helical gears HG(A), HG(B) in ① and ② directions. To this end, electromagnetic pick-ups P(A), P(B) are provided on the respective helical gears HG(A), HG(B) to align in the same axis AX of the helical gears. The electromagnetic pick-ups P(A), P(B) detect the front ends of the gear teeth. The direction of the rotation is obtained from the pulse phase difference based on the two pulses detected at the electromagnetic pick-ups P(A), P(B). As best seen in FIG. 9B, when the helical gears HG(A), HG(B) rotate to the ① direction, the pulse detected at the electromagnetic pick-up P(B) shifts back from that detected at the electromagnetic pick-up P(A). In other words, the front ends of the gear teeth of the helical gear HG(A) are detected before those of the gear teeth of the helical gear HG(B). Meanwhile, when the helical gears HG(A), HG(B) rotate to the ② direction, the pulse detected at the electromagnetic pick-up P(B) shifts forward to that detected at the electromagnetic pick-up P(A) (FIG. 9C). In other words, the front ends of the gear teeth of the helical gear HG(A) are detected after those of the gear teeth of the helical gear HG(B). The direction of the rotation is therefore detected by the pulse phase difference. Rotation in the ① direction indicates backward displacement of the vehicle. Backward displacement is detected by the relative positions of the two pulses obtained from the electromagnetic pick-ups P(A), P(B) mentioned above. As long as there is a phase difference, any known gears other than helical gears HG(A), HG(B) may be employed.

IV) A vehicle speed pulse is input and the vehicle is fully stopped before the input of the vehicle speed pulse. This is a condition for the following reason. When the vehicle displaces from the fully stopped position, backward displacement (possible backward displacement) of the vehicle is detected and then the driving force is switched to the strong creep condition to keep the vehicle against the slope. Although displacement of the vehicle is detected, a determination is not carried out to specify the direction as to whether the vehicle moves forward or backwards. When the vehicle stops on an up slope, the total amount of driving force in the weak creep condition (driving force is zero if engine 1 is automatically stopped) and braking force resists the backward displacement force of the vehicle. However, because the greater the inclination angle of the slope, the greater the backward displacement force, the vehicle starts to displace forward (on a down slope) or backwards (on an up slope) with the displacement force derived from the vehicle's own weight being greater than the total amount of the driving force in the weak creep condition and the braking force. For this reason, when forward or backward displacement (i.e. displacement) of the vehicle is detected, the driving force is switched from the weak creep condition to the strong creep condition to generate sufficient driving force against the slope. For the purpose of the detecting that the vehicle stops completely, the vehicle speed pulse of zero is detected before a vehicle speed pulse is input Displacement of the vehicle is detected even from one vehicle speed pulse input. The The driving force may be switched to the strong creep condition even if the vehicle displaces in the same direction in which the driver intends to move.

Conditions for Automatically Actuating the Engine

Figure 8B:
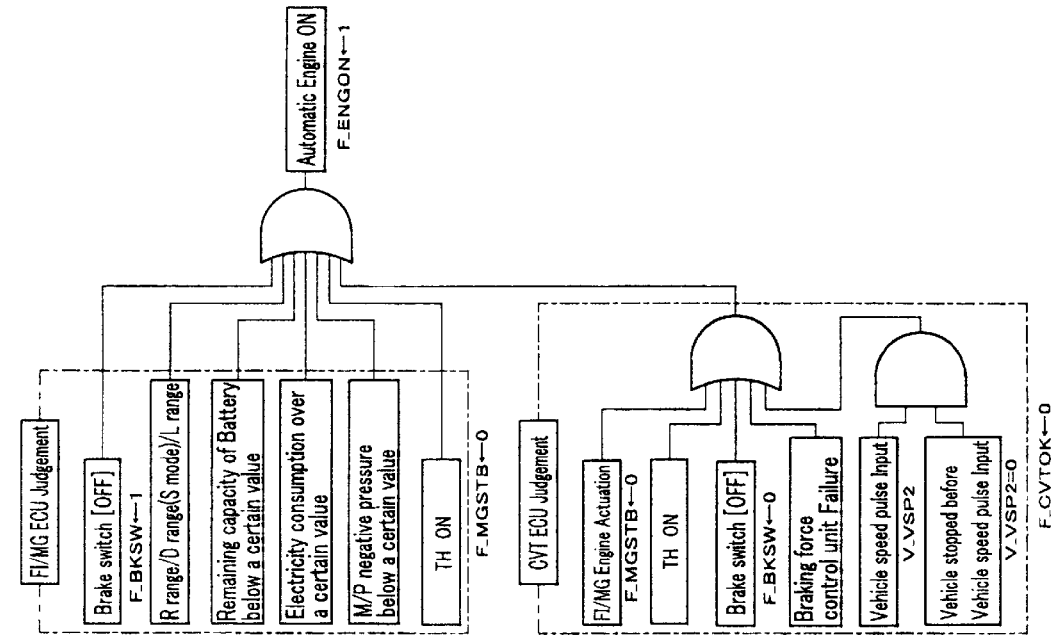
FIGS. 8A and 8B show the control logic for automatically actuating the engine. Here.
Figure 8A:
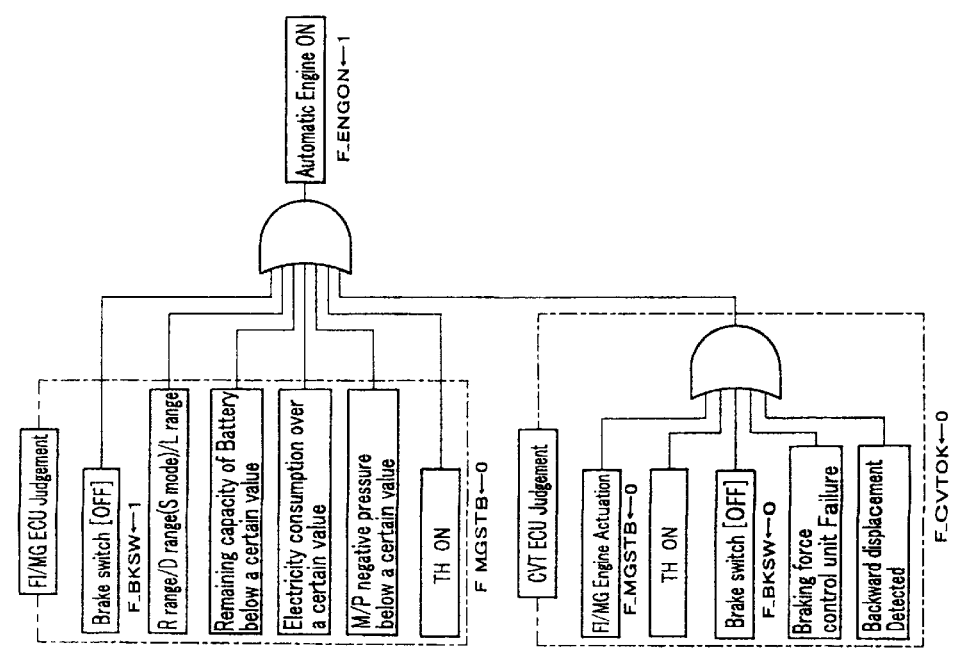

After automatically stopping engine 1, engine 1 is automatically restarted in the following conditions. When any of the following conditions shown in FIGS. 8A and 8B is satisfied, an automatic engine actuation order (F_ENGON) is transmitted and engine 1 is automatically actuated. The automatic engine actuation is carried out by the driving motor stopping unit. Therefore, the following automatic engine actuation conditions are determined at the driving motor stopping unit. Specifically, the automatic engine actuation conditions are determined at FI/MG ECU 4 and CVT ECU 6. When FI/MG ECU 4 determines that any of the following conditions I) to VI) is satisfied, F_MGSTB becomes 0. When CVT ECU 6 determines that any of the following conditions VII) to XI) [or VII) to X) and XII)] is satisfied, F_CVTOK becomes 0. The first condition required for the automatic engine actuation order (shown in FIG. 8A) is the same as the second condition shown in FIG. 8B, except for the conditions XI) and XII) which are determined by CVT ECU 6. Therefore, the explanation refers only to the difference as to the second condition thereof.

I) Depression of the brake pedal BP is released (Brake switch BSW is OFF). This is a condition because the determination of the starting operation is carried out when the driver releases the brake pedal BP. When the driver releases the brake pedal BP in the D range/D mode, it is assumed that the driver initiates the starting operation. Therefore, engine 1 is automatically actuated. Meanwhile, when the driver releases the brake pedal BP in P or N range to stop and exit the vehicle, engine 1 is automatically actuated in order to remind the driver not to exit the vehicle without turning off the ignition switch.

II) Positioning switch PSW and Mode switch MSW select R range/D range (S mode)/L range. This is a condition because the driver intends to start the vehicle quickly if the positioning switch PSW and the mode switch MSW select the R range/D range (S mode)/L range after engine 1 is stopped. Therefore, when engine 1 is stopped with the transmission set in other than the R range/D range (S mode)/L range and thereafter switched to the R range/D range (S mode)/L range, engine 1 is automatically actuated.

III) Remaining capacity of the battery is below a certain value. This is a condition because engine 1 is not automatically actuated if the remaining capacity of the battery is too low. Engine 1 is not stopped unless the remaining capacity of the battery is above a certain value. However, the capacity of the battery may lower after engine 1 is automatically stopped. In this case, engine 1 is automatically actuated for the purpose of charging the battery. The certain value is set to be higher than the critical battery capacity, below which engine 1 is not actuated.

IV) Electricity consumption is above a certain value. While components that consume electricity, such as lights, are on, the capacity of the battery decreases quickly. As a result, engine 1 will not be restarted. For this reason, irrespective of the remaining capacity of the battery, engine 1 is automatically actuated when the electricity consumption is above a certain value.

V) Negative pressure of the master power MP is below a certain value. This is a condition because the lower the negative pressure at the master power MB, the lower the obtained braking force. Therefore, engine 1 is restarted to secure sufficient braking force.

VI) Accelerator pedal is depressed (TH ON). This is a condition because the driver is expecting driving force from engine 1. Therefore, engine 1 is automatically actuated when the accelerator pedal is depressed.

VII) Automatic engine actuation condition at FI/MG ECU 4 is satisfied. This is a condition because CVT ECU 6 also determines the automatic engine actuation conditions of FI/MG ECU 4.

VIII) Accelerator pedal is depressed (TH ON). This is a condition because the driver is expecting driving force from engine 1. Therefore, engine 1 is automatically actuated when the accelerator pedal is depressed.

IX) Depression of the brake pedal BP is released (Brake switch BSW is OFF). This is a condition because determination of the starting operation is carried out when the driver releases the brake pedal BP. When the driver releases the brake pedal BP in the D range/D mode, it is assumed that the driver initiates the starting operation. Therefore, engine 1 is automatically actuated.

X) Braking force control unit BCU is out of order. This a condition because when the braking force control unit Ba) is out of order and the braking force is not retained, the vehicle displaces backwards (forward) on a slope with the automatic engine stop operation. Therefore, when a solenoid valve SV of the braking force control unit BCU is out of order, engine 1 is automatically actuated and the vehicle is kept in the strong creep condition.

If a failure is detected in the braking force control unit BCU after stopping engine 1, engine 1 is immediately actuated such that the driving force of the vehicle is kept in the strong creep condition. This is because the braking force may not be retained after releasing the brake pedal BP upon starting the vehicle. In other words, it is the strong creep condition that prevents the vehicle from unintentional backward displacement and facilitates a smooth starting operation of the vehicle.

XI) Backward displacement of the vehicle is detected. This is a condition because when the vehicle starts to displace backwards on a steep slope with the backward displacement force derived from the vehicle's own weight being greater than braking force, the vehicle is prevented from backward displacement by the driving force of engine 1. When the vehicle stops on an up slope, the braking force resists the backward displacement force of the vehicle. However, because the greater the inclination angle of the slope the greater the backward displacement force, the vehicle starts to displace backwards on the steep slope with the backward displacement force being greater than the braking force. For this reason, when backward displacement of the vehicle is detected, the driving force is switched from the engine stop condition to the strong creep condition in any circumstances to generate sufficient driving force against the slope. Because the method of detecting backward displacement of the vehicle has been explained in Conditions required for Strong Creep Order section, further explanation will be omitted.

XII) A vehicle speed pulse is input and the vehicle is fully stopped before the input of the vehicle speed pulse. This is a condition for the following reason. When the vehicle displaces from the fully stopped position, backward displacement (possible backward displacement) of the vehicle is detected and then engine 1 is automatically actuated to generate driving force against the slope. Although displacement of the vehicle is detected, a determination is not carried out to specify the direction as to whether the vehicle moves forward or backwards. When the vehicle stops on an up slope with engine 1 stopped, only the braking force resists the backward displacement force of the vehicle. However, because the greater the inclination angle of the slope, the greater the backward displacement force, the vehicle starts to displace forward (on a down slope) or backwards (on an up slope) with the displacement force derived from the vehicle's own weight being greater than the braking force. For this reason, when forward or backward displacement (i.e. displacement) of the vehicle is detected, engine 1 is automatically actuated so as to generate sufficient driving force in the strong creep condition. For the purpose of detecting that the vehicle stops completely, the vehicle speed pulse of zero is detected before a vehicle speed pulse is input. Displacement of the vehicle is detected even from one vehicle speed pulse input.

Time Chart for Control with Automatic Engine Stop Operation

With reference to a time chart shown in FIG. 10, the way of controlling the vehicle according to the preferred embodiment will be described. The vehicle is running.

The vehicle having the above system is operated in the order of braking, stopping and starting. In this operation, the driving force is decreased from the strong creep condition for driving to the weak creep condition by the driving force decreasing unit DDU, and thereafter engine 1 is stopped by the driving motor stopping unit The positioning switch PSW and the mode switch MSW of the vehicle are not changed from the D range/D mode. The braking force control unit BCU comprises a relief valve RV.

Figure 10:
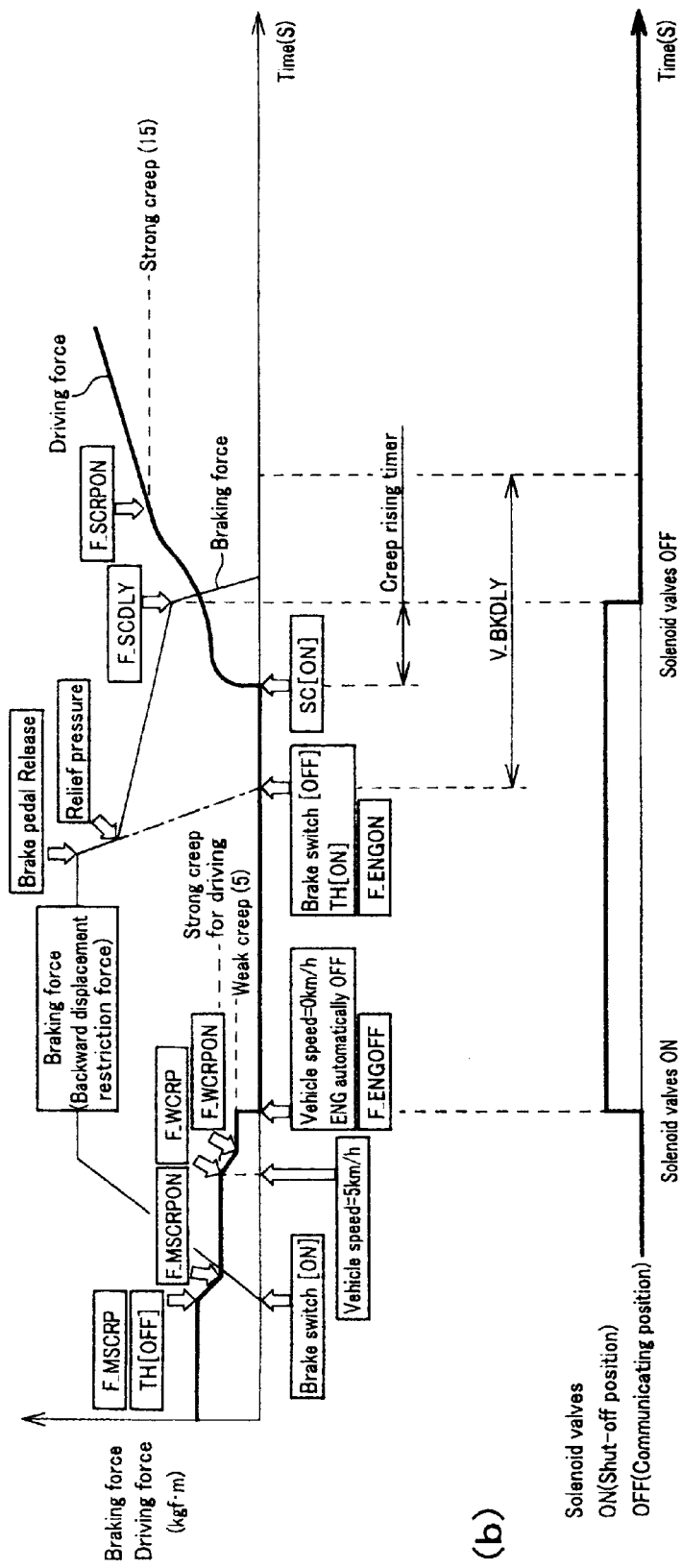
FIG. 10 is a time chart for the control of the vehicle provided with AN apparatus for controlling and stopping a driving motor stopping in which the engine is automatically stopped. Here, (a) indicates the relationship relations (increase or decrease) between driving force and braking force, and (b) indicates the conditions (ON/OFF) of solenoid valves.

In the time chart of FIG. 10(*a*), the processes of increasing and decreasing the driving force of the vehicle are shown in time sequence order. A thick line indicates the driving force and a thin line indicates the braking force. In the time chart of FIG. 10(*b*), ON/OFF (shut-off position/communicating position) of the solenoid valves SV is shown.

The driving force decreasing unit DDU transmits a strong creep order for driving (F_MSCRP) when the driver releases the accelerator pedal (TH [OFF]) while the vehicle is running (vehicle speed >5 km/h). The driving force is then switched to the strong creep condition for driving (M_MSCRPON), which is less than the strong creep condition (F_SCRPON).

If the driver releases the accelerator pedal and depresses the brake pedal BP (brake switch BSW is ON), the braking force increases. When the vehicle speed falls to 5 km/h with continued braking application, the driving force decreasing unit DDU transmits a weak creep order (F_WCRP) and driving force is switched to the weak creep condition (F_WCRPON). When doing so, because the driving force decreases to the weak creep condition through the strong creep condition for driving, the driver does not experience a strong deceleration.

When the vehicle speed falls to 0 km/h, the braking force control unit BCU switches the solenoid valves SV to the shut-off position to retain braking force. Further, the driving motor stopping unit automatically stops engine 1 (F_ENGOFF) and the driving force is lost. Because the driving force is in the weak creep condition before engine 1 is automatically stopped, the driving force falls to zero from a smaller driving force in the weak creep condition, leading to a smaller driving force difference. Further, because the driving force is decreased to the weak creep condition before automatically stopping engine 1, the braking force required for stopping the vehicle may be less than that required in the strong creep condition. In other words, the vehicle can be stopped in the weak creep condition even if depression of the brake pedal BP is reduced less. According to the detectability of the vehicle speed sensor or throughput of the ECU, the detected vehicle speed may be 0 km/h even if the vehicle does not stop completely. Despite the detected vehicle speed being 0 km/h, the actual vehicle speed may not be 0 km/h and the vehicle moves at an extremely low speed (the vehicle is in a condition just before stopping). However, even if the driving motor stopping unit automatically stops engine 1 before the vehicle stops completely (detected vehicle speed is 0 km/h), the vehicle does not stop suddenly and the driver can perform a smooth stopping operation without any awkwardness, because of the smaller driving force difference and weaker braking force. Engine 1 is automatically stopped for the purposes of improved fuel consumption as well as reducing of exhaust gas.

The driver then releases the brake pedal BP in order to prepare for restarting the vehicle. If the diver depresses the brake pedal BP more than a preset pressure of the relief valve RV (relief pressure), the relief valve RV actuates upon the driver releasing the brake pedal BP and braking force immediately decreases to the relief pressure. Providing the relief valve RV ensures a smooth starting operation of the vehicle on a slope, even if the driver depresses the brake pedal BP more than is required.

When the brake fluid pressure within the wheel cylinders WC falls below the relief pressure, the brake fluid pressure gradually decreases by the operation of the solenoid valve SV and the restriction D of the braking force control unit BCU. Accordingly, the braking force gradually decreases. Backward displacement of the vehicle is restricted by the braking force being gradually reduced but still retained.

While the braking force gradually decreases, releasing the brake pedal BP turns the brake switch BSW OFF, leading to transmission of an automatic engine actuation order (F_ENGON). After a time lag derived from a delay of signal communication and mechanisms, engine 1 is automatically actuated and the supply of pressure oil to the starting clutch at CVT 3 is initiated (SC [ON]). Driving force thereby increases.

Hydraulic oil has been discharged from the oil pressure chamber of the starting clutch at CVT 3 while engine 1 is stopped Therefore, when engine 1 is actuated and the supply of pressure oil to the starting clutch is initiated, the driving force suddenly rises (sudden rise of the driving force at SC [ON]) due to resistance of a piston enforcing the clutch. Further, a clearance or play exists for the advance stroke of the piston while engine 1 is stopped because hydraulic oil has been discharged. Therefore, the hydraulic pressure command value to the starting clutch does not correspond to the actual hydraulic pressure value; hence the driving force transmission capacity of the starting clutch increases little by little until the oil pressure chamber is filled with hydraulic oil. As a result, the driving force gradually increases, and when the oil pressure chamber is filled with hydraulic oil, the driving force then increases in accordance with the hydraulic pressure command value.

The braking force control unit BCU instantly releases the braking force retained by the solenoid valves SV during the process of increasing the driving force to the strong condition (F_SCDLY). Even if the braking force is instantly released at this stage, a smooth starting operation of the vehicle is achieved by the increasing driving force because the inertial force and the rolling resistance (increasing driving force) of the vehicle restricts backward displacement The timing at which the release of the braking force is carried out occurs when a certain period of time passes after the supply of pressure oil is initiated (SC [ON]) to the starting clutch at CVT 3. The certain time is counted by a creep rising timer. When the certain time has passed, a signal (creep rising signal F_SCDLY) is transmitted to release the braking force. Because the brake switch BSW is OFF, the solenoid valve SV is immediately returned to the communicating position, thereby releasing the braking force. The reason for determining the creep rising condition by using the timer is that the hydraulic pressure command value to the starting clutch does not correspond to the actual hydraulic pressure value (driving force transmission capacity). This is because hydraulic oil has been discharged from the oil pressure chamber of the starting clutch while engine 1 is stopped.

As mentioned above, even if the braking force is instantly released during the process of increasing the driving force to the strong creep condition, a smooth starting operation of the vehicle is achieved with backward displacement of the vehicle restricted by the inertial force of the vehicle and the like. The vehicle then increases the driving force and accelerates when the accelerator pedal is depressed (IX ([ON]).

As shown in FIG. 10(*a*), a dashed and dotted extends line downward from "Relief pressure" on the line indicating braking force. The dashed and dotted line indicates a situation where the brake fluid pressure is not retained. In this situation, because reduction of the braking force takes place immediately after decreasing the brake pedal load and braking force is quickly lost, a smooth starting operation of the vehicle is not achieved. The dashed and dotted line also indicates returned conditions of the brake pedal BP.

According to the invention, because the driving motor stopping unit decreases the driving force before automatically stopping the driving motor, the braking force required for stopping the vehicle is less than that required before decreasing the driving force. Further, the driving force difference upon stopping the driving motor becomes smaller. Therefore, the vehicle stops smoothly without sudden impact, even if the driving motor is stopped before automatically stopping the vehicle.

While the present invention has been described by way of a specific example, it is to be understood that changes and variations may be made without departing from the spirit or scope of the following claims.

For example, the driving motor stopping unit has been described with a vehicle having CVT, however, it may be applicable to other vehicles, such as an automatic transmission-type vehicle with a torque converter.

What is claim is:

1. A driving motor stopping apparatus for a vehicle, wherein the vehicle allows transmission of a driving force from a driving motor to driving wheels irrespective of releasing an accelerator pedal at a speed lower than a creeping speed when a transmission is set in a driving range, comprising:

a driving force decreasing unit for switching a wheel driving force to be transmitted to the driving wheels from the driving motor to a lower driving force when a brake pedal of the vehicle is depressed than when the brake pedal is released, and a driving motor stopping unit,
   wherein said driving motor stopping unit determines that the wheel driving force has been decreased and then stops the driving motor.

2. The driving motor stopping apparatus of claim 1 wherein said vehicle is further provided with a braking force control unit for continuously retaining braking force after the depression of the brake pedal is released.

3. The driving motor stopping apparatus of claim 1 wherein said driving motor stopping unit comprises:
   a first control unit; and
   a second control unit,
   wherein the first control unit and the second control unit together determine automatic engine stop conditions.

4. The driving motor stopping apparatus of claim 3 wherein said first control unit is a fuel injection electronic control unit and
   said second control unit is a continuously variable transmission control unit.

5. The driving motor stopping apparatus of claim 1 wherein said driving force decreasing unit decreases the wheel driving force determined by the driving motor stopping unit.

6. The driving motor stopping apparatus of claim 5 wherein said driving force decreasing unit determines conditions for at least three different creep settings,
   wherein said three different creep settings correspond to creep driving force for the vehicle in three different conditions.

7. The driving motor stopping apparatus of claim 2 wherein said driving motor stopping unit comprises:
   a first control unit; and
   a second control unit,
   wherein the first control unit and the second control unit together determine automatic engine stop conditions.

8. The driving motor stopping apparatus of claim 7 wherein said first control unit is a fuel injection electronic control unit and
   said second control unit is a continuously variable transmission control unit.

9. The driving motor stopping apparatus of claim 2 wherein said driving force decreasing unit decreases the wheel driving force determined by the driving motor stopping unit.

10. The driving motor stopping apparatus of claim 9 wherein said driving force decreasing unit determines conditions for at least three different creep settings,
    wherein said three different creep settings correspond to creep driving force for the vehicle in three different conditions.

11. A vehicle with a driving motor stopping apparatus, wherein the vehicle allows transmission of a driving force from a driving motor to driving wheels irrespective of releasing an accelerator pedal at a speed lower than a creeping speed when a transmission is set in a driving range, comprising:

a driving force decreasing unit for switching a wheel driving force to be transmitted to the driving wheels from the driving motor to a lower driving force when a brake pedal of the vehicle is depressed than when the brake pedal is released, and a driving motor stopping unit,
    wherein said driving motor stopping unit determines that the wheel driving force has been decreased and then stops the driving motor.

12. The vehicle of claim 11 further comprising a braking force control unit for continuously retaining braking force after the depression of the brake pedal is released.

13. The vehicle of claim 11 wherein said driving motor stopping unit comprises:
    a first control unit; and
    a second control unit,
    wherein the first control unit and the second control unit together determine automatic engine stop conditions.

14. The vehicle of claim 13 wherein said first control unit is a fuel injection electronic control unit and
    said second control unit is a continuously variable transmission control unit.

15. The vehicle of claim 11 wherein said driving force decreasing unit decreases the wheel driving force determined by the driving motor stopping unit.

16. The vehicle of claim 15 wherein said driving force decreasing unit determines conditions for at least three different creep settings,
    wherein said three different creep settings correspond to creep driving force for the vehicle in three different conditions.

17. The vehicle of claim 12 wherein said driving motor stopping unit comprises:
    a first control unit; and
    a second control unit,
    wherein the first control unit and the second control unit together determine automatic engine stop conditions.

18. The vehicle of claim 17 wherein said first control unit is a fuel injection electronic control unit and said second control unit is a continuously variable transmission control unit.

19. The vehicle of claim 12 wherein said driving force decreasing unit decreases the wheel driving force determined by the driving motor stopping unit.

20. The vehicle of claim 19 wherein said driving force decreasing unit determines conditions for at least three different creep settings, wherein said three different creep settings correspond to creep driving force for the vehicle in three different conditions.

* * * * *